United States Patent
Wang et al.

(10) Patent No.: US 11,289,701 B2
(45) Date of Patent: Mar. 29, 2022

(54) STRUCTURALLY CONTROLLED DEPOSITION OF SILICON ONTO NANOWIRES

(71) Applicant: Amprius, Inc., Fremont, CA (US)

(72) Inventors: Weijie Wang, Sunnyvale, CA (US); Zuqin Liu, Sunnyvale, CA (US); Song Han, Foster City, CA (US); Jonathan Bornstein, Cupertino, CA (US); Constantin Ionel Stefan, San Jose, CA (US)

(73) Assignee: Amprius, Inc., Fremont, CA (US)

( * ) Notice: Subject to any disclaimer, the term of this patent is extended or adjusted under 35 U.S.C. 154(b) by 0 days.

(21) Appl. No.: 15/931,470

(22) Filed: May 13, 2020

(65) Prior Publication Data
US 2020/0274156 A1 Aug. 27, 2020

Related U.S. Application Data

(60) Division of application No. 15/887,809, filed on Feb. 2, 2018, now Pat. No. 10,707,484, which is a continuation of application No. 14/710,103, filed on May 12, 2015, now Pat. No. 9,923,201.

(60) Provisional application No. 61/992,121, filed on May 12, 2014.

(51) Int. Cl.
| | | |
|---|---|---|
| H01M 4/38 | (2006.01) |
| H01M 4/04 | (2006.01) |
| H01M 4/134 | (2010.01) |
| H01M 4/36 | (2006.01) |
| H01M 4/02 | (2006.01) |
| H01M 10/0525 | (2010.01) |
| H01M 4/1395 | (2010.01) |
| H01M 10/052 | (2010.01) |

(52) U.S. Cl.
CPC ......... *H01M 4/386* (2013.01); *H01M 4/0428* (2013.01); *H01M 4/134* (2013.01); *H01M 4/1395* (2013.01); *H01M 4/366* (2013.01); *H01M 10/0525* (2013.01); *H01M 10/052* (2013.01); *H01M 2004/027* (2013.01)

(58) Field of Classification Search
CPC .. H01M 4/0428; H01M 4/134; H01M 4/1395; H01M 4/366; H01M 4/386; H01M 10/052; H01M 10/0525; H01M 2004/027; Y02E 60/10
See application file for complete search history.

(56) References Cited

U.S. PATENT DOCUMENTS

| | | |
|---|---|---|
| 4,366,215 A | 12/1982 | Coetzer et al. |
| 4,436,796 A | 3/1984 | Huggins et al. |
| 5,426,006 A | 6/1995 | Delnick et al. |
| 5,457,343 A | 10/1995 | Ajayan |
| 5,702,845 A | 12/1997 | Kawakami et al. |
| 5,855,860 A | 1/1999 | Nishimine |
| 5,997,832 A | 12/1999 | Lieber |
| 6,025,094 A | 2/2000 | Visco et al. |
| 6,083,644 A | 7/2000 | Watanabe et al. |
| 6,090,505 A | 7/2000 | Shimamura et al. |
| 6,238,821 B1 | 5/2001 | Mukherjee et al. |
| 6,334,939 B1 | 1/2002 | Zhou |
| 6,355,377 B1 | 3/2002 | Sheem et al. |
| 6,423,453 B1 | 7/2002 | Noda |
| 6,514,395 B2 | 2/2003 | Zhou |
| 6,667,099 B1 | 12/2003 | Greiner et al. |
| 7,189,476 B1 | 3/2007 | Macklin et al. |
| 7,402,829 B2 | 7/2008 | Green |
| 7,408,829 B2 | 8/2008 | Kuang et al. |
| 7,438,759 B2 | 10/2008 | Zhang et al. |
| 7,682,750 B2 | 3/2010 | Chen |
| 7,704,480 B2 | 4/2010 | Jiang et al. |
| 7,794,840 B2 | 6/2010 | Grigorian et al. |
| 7,816,031 B2 | 10/2010 | Cui et al. |
| 7,816,709 B2 | 10/2010 | Balzano et al. |
| 7,951,489 B2 | 5/2011 | Kim et al. |
| 8,017,272 B2 | 9/2011 | Feng et al. |
| 8,202,568 B2 | 6/2012 | Lin et al. |

(Continued)

FOREIGN PATENT DOCUMENTS

| | | |
|---|---|---|
| CN | 1891668 A | 1/2004 |
| CN | 1476645 A | 2/2004 |

(Continued)

OTHER PUBLICATIONS

Westra, J.M., Vavrunkova, V., Sutta, P., van Swaaij, R.A.C.M.M., Zeman, M.—Formation of thin-film crystalline silicon on glass observed by in-situ XRD, Energy Procedia 2 (2010), pp. 235-241 (Year: 2010).*

(Continued)

*Primary Examiner* — Anca Eoff
(74) *Attorney, Agent, or Firm* — Weaver Austin Villeneuve & Sampson LLP

(57) ABSTRACT

Provided herein are nanostructures for lithium ion battery electrodes and methods of fabrication. In some embodiments, a nanostructure template coated with a silicon coating is provided. The silicon coating may include a non-conformal, more porous layer and a conformal, denser layer on the non-conformal, more porous layer. In some embodiments, two different deposition processes, e.g., a PECVD layer to deposit the non-conformal layer and a thermal CVD process to deposit the conformal layer, are used. Anodes including the nanostructures have longer cycle lifetimes than anodes made using either a PECVD or thermal CVD method alone.

22 Claims, 12 Drawing Sheets

(56) References Cited

U.S. PATENT DOCUMENTS

| | | |
|---|---|---|
| 8,206,569 B2 | 6/2012 | Lopatin et al. |
| 8,241,372 B2 | 8/2012 | Cheng et al. |
| 8,252,245 B2 | 8/2012 | Tonkovich et al. |
| 8,257,866 B2 | 9/2012 | Loveness et al. |
| 8,263,258 B2 | 9/2012 | Nakazato et al. |
| 8,367,240 B2 | 2/2013 | Honda |
| 8,420,258 B2 | 4/2013 | Rojeski |
| 8,450,012 B2 | 5/2013 | Cui et al. |
| 8,481,214 B2 | 7/2013 | Rojeski |
| 8,491,718 B2 | 7/2013 | Chaudhari |
| 8,556,996 B2 | 10/2013 | Loveness et al. |
| 8,568,914 B2 | 10/2013 | Pol et al. |
| 8,652,683 B2 | 2/2014 | Rojeski |
| 8,658,310 B2 | 2/2014 | Rojeski |
| 8,709,654 B2 | 4/2014 | Takeuchi et al. |
| 8,828,481 B2 | 9/2014 | Burton et al. |
| 8,877,374 B2 | 11/2014 | Cui et al. |
| 8,900,748 B2 | 12/2014 | Cho |
| 9,172,088 B2 | 10/2015 | Loveness et al. |
| 9,172,094 B2 | 10/2015 | Loveness et al. |
| 9,231,243 B2 | 1/2016 | Cui et al. |
| 9,412,998 B2 | 8/2016 | Rojeski et al. |
| 9,431,181 B2 | 8/2016 | Rojeski |
| 9,698,410 B2 | 7/2017 | Fasching et al. |
| 9,780,365 B2 | 10/2017 | Liu et al. |
| 9,917,300 B2 | 3/2018 | Rojeski |
| 9,923,201 B2 | 3/2018 | Wang et al. |
| 9,979,017 B2 | 5/2018 | Rojeski |
| 10,090,512 B2 | 10/2018 | Cui et al. |
| 10,096,817 B2 | 10/2018 | Loveness et al. |
| 10,230,101 B2 | 3/2019 | Loveness et al. |
| 10,461,359 B2 | 10/2019 | Cui et al. |
| 10,707,484 B2 | 7/2020 | Wang et al. |
| 10,811,675 B2 | 10/2020 | Cui et al. |
| 11,024,841 B2 | 6/2021 | Loveness et al. |
| 2002/0028384 A1 | 3/2002 | Krasnov et al. |
| 2002/0102461 A1 | 8/2002 | Baker et al. |
| 2002/0137334 A1* | 9/2002 | Watanabe ......... C23C 16/45572 438/677 |
| 2002/0148727 A1 | 10/2002 | Zhou et al. |
| 2003/0175589 A1 | 9/2003 | Kaminaka et al. |
| 2003/0178104 A1 | 9/2003 | Sekine |
| 2003/0203139 A1 | 10/2003 | Ren et al. |
| 2004/0023111 A1 | 2/2004 | Ohshita et al. |
| 2004/0126653 A1 | 7/2004 | Visco et al. |
| 2004/0126659 A1 | 7/2004 | Graetz |
| 2004/0197641 A1 | 10/2004 | Visco et al. |
| 2004/0258984 A1* | 12/2004 | Ariel ............ H01M 6/40 429/152 |
| 2005/0100793 A1 | 5/2005 | Jonghe et al. |
| 2005/0153208 A1 | 7/2005 | Konishiike et al. |
| 2005/0175901 A1 | 8/2005 | Kawakami et al. |
| 2005/0238810 A1 | 10/2005 | Scaringe et al. |
| 2005/0279274 A1 | 12/2005 | Nui et al. |
| 2006/0040182 A1 | 2/2006 | Kawakami et al. |
| 2006/0066201 A1 | 3/2006 | Ra et al. |
| 2006/0097691 A1 | 5/2006 | Green |
| 2006/0147797 A1 | 7/2006 | Wu et al. |
| 2006/0154141 A1 | 7/2006 | Salot et al. |
| 2006/0165988 A1 | 7/2006 | Chiang et al. |
| 2006/0204853 A1 | 9/2006 | Chen |
| 2006/0216603 A1 | 9/2006 | Choi |
| 2006/0258133 A1 | 11/2006 | Georgiev et al. |
| 2006/0261134 A1 | 11/2006 | Ho |
| 2007/0065720 A1 | 3/2007 | Hasegawa et al. |
| 2007/0095276 A1 | 5/2007 | Sunkara et al. |
| 2007/0117007 A1 | 5/2007 | Visco et al. |
| 2007/0148544 A1 | 7/2007 | Le |
| 2007/0154808 A1 | 7/2007 | Konishiike et al. |
| 2007/0190422 A1 | 8/2007 | Morris |
| 2007/0212538 A1 | 9/2007 | Niu |
| 2007/0298168 A1 | 12/2007 | Ajayan et al. |
| 2008/0008844 A1 | 1/2008 | Bettge et al. |
| 2008/0038638 A1 | 2/2008 | Zhang et al. |
| 2008/0044732 A1 | 2/2008 | Salot et al. |
| 2008/0057399 A1 | 3/2008 | Visco et al. |
| 2008/0087314 A1 | 4/2008 | Xiao et al. |
| 2008/0110486 A1 | 5/2008 | Tsakalokos et al. |
| 2008/0145762 A1 | 6/2008 | Adachi et al. |
| 2008/0161746 A1 | 7/2008 | Visco et al. |
| 2008/0206641 A1 | 8/2008 | Christensen et al. |
| 2008/0213603 A1 | 9/2008 | Kobayashi et al. |
| 2008/0261116 A1 | 10/2008 | Burton et al. |
| 2008/0274403 A1 | 11/2008 | Kim et al. |
| 2008/0280169 A1 | 11/2008 | Niu et al. |
| 2008/0280207 A1 | 11/2008 | Patoux et al. |
| 2009/0004566 A1 | 1/2009 | Shirane et al. |
| 2009/0029256 A1 | 1/2009 | Mah |
| 2009/0042102 A1 | 2/2009 | Cui et al. |
| 2009/0061319 A1 | 3/2009 | Kim et al. |
| 2009/0068553 A1 | 3/2009 | Firsich et al. |
| 2009/0117472 A1 | 5/2009 | Iwamoto |
| 2009/0162746 A1 | 6/2009 | Honda |
| 2009/0169996 A1 | 7/2009 | Zhamu et al. |
| 2009/0176159 A1 | 7/2009 | Zhamu et al. |
| 2009/0186267 A1 | 7/2009 | Tiegs |
| 2009/0188544 A1 | 7/2009 | Kobayashi et al. |
| 2009/0202908 A1 | 8/2009 | Sumihara et al. |
| 2009/0202915 A1 | 8/2009 | Modeki et al. |
| 2009/0214942 A1 | 8/2009 | Frank et al. |
| 2009/0214944 A1 | 8/2009 | Rojeski |
| 2009/0246628 A1 | 10/2009 | Adachi et al. |
| 2009/0269511 A1 | 10/2009 | Zhamu et al. |
| 2009/0291371 A1 | 11/2009 | Konishiike et al. |
| 2009/0305131 A1 | 12/2009 | Kumar et al. |
| 2009/0305135 A1 | 12/2009 | Shi et al. |
| 2009/0311605 A1 | 12/2009 | Visco et al. |
| 2009/0316335 A1 | 12/2009 | Simon et al. |
| 2010/0043877 A1 | 2/2010 | Wang et al. |
| 2010/0119948 A1 | 5/2010 | Hasegawa et al. |
| 2010/0122725 A1 | 5/2010 | Buchine et al. |
| 2010/0159337 A1 | 6/2010 | Matsumoto et al. |
| 2010/0176337 A1 | 7/2010 | Zhamu et al. |
| 2010/0209775 A1 | 8/2010 | Kim et al. |
| 2010/0237272 A1 | 9/2010 | Chaudhari |
| 2010/0266897 A1 | 10/2010 | Lee et al. |
| 2010/0285358 A1 | 11/2010 | Cui et al. |
| 2010/0291441 A1 | 11/2010 | Ugaji et al. |
| 2010/0297502 A1 | 11/2010 | Zhu et al. |
| 2010/0310941 A1 | 12/2010 | Kumta et al. |
| 2010/0330421 A1 | 12/2010 | Cui et al. |
| 2010/0330423 A1 | 12/2010 | Cui et al. |
| 2011/0008233 A1 | 1/2011 | Miyanaga |
| 2011/0027655 A1 | 2/2011 | Rojeski |
| 2011/0111294 A1 | 5/2011 | Lopez et al. |
| 2011/0111300 A1 | 5/2011 | DelHagen et al. |
| 2011/0111304 A1 | 5/2011 | Cui et al. |
| 2011/0135925 A1 | 6/2011 | Zhamu et al. |
| 2011/0143019 A1 | 6/2011 | Mosso et al. |
| 2011/0143263 A1 | 6/2011 | Shirvanian et al. |
| 2011/0159365 A1 | 6/2011 | Loveness et al. |
| 2011/0159367 A1 | 6/2011 | Kim et al. |
| 2011/0189510 A1 | 8/2011 | Caracciolo et al. |
| 2011/0205688 A1 | 8/2011 | Ray et al. |
| 2011/0229761 A1 | 9/2011 | Cui et al. |
| 2011/0269025 A1 | 11/2011 | Sun et al. |
| 2011/0287318 A1 | 11/2011 | Loveness et al. |
| 2012/0028123 A1 | 2/2012 | Asari et al. |
| 2012/0034524 A1 | 2/2012 | Caracciolo et al. |
| 2012/0070741 A1 | 3/2012 | Liu et al. |
| 2012/0094192 A1 | 4/2012 | Jun et al. |
| 2012/0183856 A1 | 7/2012 | Cui et al. |
| 2012/0002925 A1 | 11/2012 | Yamauchi et al. |
| 2012/0301785 A1 | 11/2012 | Buchine et al. |
| 2012/0301789 A1 | 11/2012 | Loveness et al. |
| 2012/0328942 A1 | 12/2012 | Thomas-Alyea et al. |
| 2013/0004657 A1 | 1/2013 | Xu et al. |
| 2013/0011736 A1 | 1/2013 | Loveness et al. |
| 2013/0069601 A1 | 3/2013 | Coowar et al. |
| 2013/0078523 A1 | 3/2013 | Rojeski |
| 2013/0143124 A1 | 6/2013 | Lee et al. |
| 2013/0247966 A1 | 9/2013 | Buchine et al. |
| 2013/0320582 A1 | 12/2013 | Cui et al. |
| 2013/0344383 A1 | 12/2013 | Loveness et al. |

(56) References Cited

U.S. PATENT DOCUMENTS

| | | |
|---|---|---|
| 2015/0325852 A1 | 11/2015 | Wang et al. |
| 2016/0013483 A1 | 1/2016 | Loveness et al. |
| 2016/0190600 A1 | 6/2016 | Cui et al. |
| 2017/0098819 A9 | 4/2017 | Loveness et al. |
| 2017/0338464 A1 | 11/2017 | Fasching et al. |
| 2018/0090755 A1 | 3/2018 | Liu et al. |
| 2019/0273252 A1 | 1/2019 | Loveness et al. |
| 2019/0058186 A1 | 2/2019 | Cui et al. |
| 2019/0088939 A1 | 3/2019 | Wang et al. |
| 2020/0274151 A1 | 8/2020 | Yu et al. |
| 2020/0274156 A1 | 8/2020 | Wang et al. |
| 2021/0104730 A1 | 4/2021 | Cui et al. |

FOREIGN PATENT DOCUMENTS

| | | |
|---|---|---|
| CN | 1705148 | 12/2005 |
| CN | 1705418 A | 12/2005 |
| CN | 1979828 A | 6/2007 |
| CN | 101346834 | 1/2009 |
| CN | 101346836 A | 1/2009 |
| CN | 101356666 A | 1/2009 |
| CN | 101356670 A | 1/2009 |
| CN | 101453013 | 6/2009 |
| CN | 101527357 | 9/2009 |
| CN | 101560694 | 10/2009 |
| CN | 101689628 A | 3/2010 |
| CN | 101453016 | 6/2010 |
| CN | 101356666 B | 10/2010 |
| CN | 101953014 | 1/2011 |
| CN | 101986447 | 3/2011 |
| CN | 101989655 | 3/2011 |
| CN | 102460782 | 5/2012 |
| CN | 101689628 B | 6/2012 |
| CN | 102959775 A | 3/2013 |
| EP | 883199 | 12/1998 |
| EP | 1205989 | 5/2002 |
| EP | 845828 | 10/2002 |
| EP | 1494302 | 1/2005 |
| EP | 1873846 | 1/2008 |
| EP | 2219250 | 8/2010 |
| EP | 2427928 | 3/2012 |
| EP | 2549567 | 1/2013 |
| FR | 2880198 | 6/2006 |
| GB | 2470056 | 11/2010 |
| JP | 2000-036323 | 2/2000 |
| JP | 2002-216751 | 8/2002 |
| JP | 2003-303588 | 10/2003 |
| JP | 2005-259697 | 9/2005 |
| JP | 2005-310759 | 11/2005 |
| JP | 2006-269306 | 10/2006 |
| JP | 2007-061945 | 3/2007 |
| JP | 2007/123100 | 5/2007 |
| JP | 2008-026595 | 2/2008 |
| JP | 2008-192594 | 8/2008 |
| JP | 2008-235258 | 10/2008 |
| JP | 2008/269827 | 11/2008 |
| JP | 2008-269827 | 11/2008 |
| JP | 2008-305781 | 12/2008 |
| JP | 2009-021226 | 1/2009 |
| JP | 2009-032693 | 2/2009 |
| JP | 2009-117165 | 5/2009 |
| JP | 2006-164137 | 7/2009 |
| JP | 2010-525549 | 7/2010 |
| JP | 2010-262752 | 11/2010 |
| JP | 2010/538444 | 12/2010 |
| JP | 2011-108639 | 6/2011 |
| JP | 2012-526364 | 10/2012 |
| JP | 2012-527735 | 11/2012 |
| JP | 2013-65547 A | 4/2013 |
| JP | 2012-556203 | 6/2013 |
| JP | 2013-521621 | 6/2013 |
| JP | 2005-071655 | 3/2016 |
| JP | 6250538 | 12/2017 |
| KR | 2006-0047424 | 5/2006 |
| KR | 2007-0043950 | 4/2007 |
| KR | 2008-0070769 | 7/2008 |
| KR | 2009/0019339 | 2/2009 |
| KR | 2010-0113433 | 10/2010 |
| WO | WO 2006/123049 | 11/2006 |
| WO | WO 2007/061945 A2 | 5/2007 |
| WO | WO 2007/071778 | 6/2007 |
| WO | WO 2007/083152 | 7/2007 |
| WO | WO 2008/044449 | 4/2008 |
| WO | WO 2007/083155 | 7/2008 |
| WO | WO 2008/139157 | 11/2008 |
| WO | WO 2009/008558 | 1/2009 |
| WO | WO 2009/009206 | 1/2009 |
| WO | WO 2009/010757 | 1/2009 |
| WO | WO 2009/010758 | 1/2009 |
| WO | WO 2009/010759 | 1/2009 |
| WO | WO 2009/031715 | 3/2009 |
| WO | WO 2009/033015 | 3/2009 |
| WO | WO2009038897 | 3/2009 |
| WO | WO 2009/129490 | 10/2009 |
| WO | WO 2010/100599 | 9/2010 |
| WO | WO 2010/129910 | 11/2010 |
| WO | WO 2010/138617 | 12/2010 |
| WO | WO 2010/138619 | 12/2010 |
| WO | WO 2011/015174 | 2/2011 |
| WO | WO 2011/053553 | 5/2011 |
| WO | WO 2011/053736 | 5/2011 |
| WO | WO 2011/056847 | 5/2011 |
| WO | WO 2011/066818 | 6/2011 |
| WO | WO 2011/094642 | 8/2011 |
| WO | WO 2011/109477 | 9/2011 |
| WO | WO 2011/137446 | 11/2011 |
| WO | WO 2011/149958 | 12/2011 |
| WO | WO 2012/027360 | 3/2012 |
| WO | WO 2012/054767 | 4/2012 |
| WO | WO 2013-096931 | 6/2013 |
| WO | WO 2014/008433 | 1/2014 |
| WO | WO 2015/175509 | 11/2015 |

OTHER PUBLICATIONS

Low Pressure Chemical Vapor Deposition Systems, MKS Instruments, 2020, https://www.mksinst.com/n/lpcvd-systems (Year: 2020).*
Machine translation of JP 2008-305781, published on Dec. 18, 2008 (Year: 2008).*
U.S. Appl. No. 12/437,529, Office Action dated May 13, 2011.
U.S. Appl. No. 12/437,529, Office Action dated Oct. 20, 2011.
U.S. Appl. No. 12/437,529, Office Action dated Dec. 22, 2011.
U.S. Office Action dated Oct. 25, 2012 issued in U.S. Appl. No. 13/427,681.
U.S. Appl. No. 13/427,681, Final Office Action dated Jun. 11, 2013.
U.S. Appl. No. 13/427,681, Office Action dated Oct. 2, 2013.
U.S. Appl. No. 13/427,681, Office Action dated May 21, 2014.
U.S. Appl. No. 13/427,681, Office Action dated Feb. 6, 2015.
U.S. Notice of Allowance dated May 22, 2018, issued in U.S. Appl. No. 13/427,681.
Examiner's Answer, dated Sep. 28, 2016, issued in U.S. Appl. No. 13/427,681.
Board of Appeal Decision, dated Nov. 15, 2017, issued in U.S. Appl. No. 13/427,681.
U.S. Office Action dated Aug. 26, 2019, issued in U.S. Appl. No. 16/109,609.
CN patent application No. 201080026302.6, Office Action dated Oct. 23, 2013.
CN patent application No. 201080026302.6, Office Action dated Aug. 8, 2014.
CN patent application No. 201080026302.6, Office Action dated Mar. 23, 2015.
CN Office Action issued in application No. 201080026302.6, dated Nov. 10, 2015.
EP patent application No. 10772907.1, Supplemental European Search Report dated Jul. 4, 2013.
IL patent application No. 216100, Office Action dated May 4, 2015.
IL patent application No. 216100, Office Action (Notification of Deficiencies Prior to Allowance of Patent Application) dated Jun. 22, 2016.

(56) References Cited

OTHER PUBLICATIONS

JP patent application No. 2012-510025, Notice of Reasons for Rejection dated Jan. 7, 2014.
JP patent application No. 2012-510025, Decision of Rejection dated Aug. 5, 2014.
WO patent application No. PCT/US2010/034106, International Search Report and Written Opinion dated Feb. 7, 2011.
U.S. Appl. No. 12/787,168, Office Action dated Jan. 10, 2013.
U.S. Appl. No. 12/787,168, Office Action dated Sep. 10, 2013.
U.S. Appl. No. 12/787,168, Office Action dated Feb. 26, 2014.
U.S. Appl. No. 12/787,168, Final Office Action dated Nov. 6, 2014.
U.S. Appl. No. 12/787,168, Non-Final Office Action dated Jul. 7, 2015.
U.S. Appl. No. 12/787,168, Final Office Action dated Apr. 11, 2016.
U.S. Appl. No. 12/787,168, Office Action dated Mar. 9, 2017.
U.S. Appl. No. 12/787,168, Final Office Action dated Dec. 20, 2017.
CN patent application No. 201080023345.9, Office Action dated Dec. 27, 2013.
CN patent application No. 201080023345.9, Office Action dated Sep. 11, 2014.
CN patent application No. 201080023345.9, Office Action dated Apr. 16, 2015.
EP patent application No. 10781151.5, Supplemental European Search Report dated Jun. 28, 2013.
Israel Office Action dated Oct. 13, 2015, IL patent application No. 216248.
JP patent application No. 2012-513225, Notification of Reasons for Rejection dated Dec. 17, 2013.
JP patent application No. 2012-513225, Decision for Grant and Allowed Claims dated Jul. 17, 2014.
Korean Notification of Provisional Rejection dated Aug. 19, 2015, KR patent application No. 10-2011-7031120.
Korean Notice of First Refusal Ruling dated Apr. 28, 2016, KR patent application No. 10-2011-7031120.
WO patent application No. PCT/US2010/036235, International Search Report and Written Opinion dated Jan. 28, 2001.
Office Action dated Apr. 5, 2012 for U.S. Appl. No. 13/039,031.
Notice of allowance dated Jul. 26, 2012 for U.S. Appl. No. 13/039,031.
U.S. Office Action dated Sep. 17, 2012 issued in U.S. Appl. No. 13/564,324.
U.S. Appl. No. 13/564,324, Notice of Allowance dated Feb. 22, 2013.
Pre-Issuance Submission by Third Party dated Jan. 15, 2014, received in U.S. Appl. No. 13/914,491.
U.S. Appl. No. 13/914,491, Office Action dated Dec. 3, 2014.
U.S. Appl. No. 13/914,491, Notice of Allowance dated Jun. 19, 2015.
Office Action dated Jan. 2, 2018 for U.S. Appl. No. 14/859,125.
Final Office Action dated Jul. 16, 2018 for U.S. Appl. No. 14/859,125.
Notice of Allowance dated Oct. 24, 2018 for U.S. Appl. No. 14/859,125.
CN patent application No. 201180019460.3, Office Action dated Jul. 2, 2014.
CN patent application No. 201180019460.3, Office Action dated May 6, 2015.
CN patent application No. 201510674597.2, Office Action and Search Report dated Mar. 28, 2017.
EP patent application No. 11751259.0, Office Action dated Dec. 12, 2016.
EP patent application No. 11751259.0, Extended Search Report dated Mar. 16, 2017.
EP Office Action issued in Application No. 11751259.0 dated May 23, 2018.
JP patent application No. 2012-556203, Office Action dated Aug. 26, 2014.
JP patent application No. 2012-556203, Office Action dated Jul. 14, 2015.
JP patent application No. 2016-077671, Office Action dated Jul. 4, 2017.
JP patent application No. 2016-077671, Office Action dated May 29, 2018.
KR patent application No. 10-2012-7024928, Office Action dated Aug. 28, 2017.
KR Office Action dated Jan. 21, 2019 for application No. 10-2018-7028397.
TW patent publication No. 201238125, published Sep. 16, 2012, English Abstract.
TW patent application No. 100120247, Office Action dated Feb. 9, 2015.
WO patent application No. PCT/US2011/026816, International Search Report and Written Opinion dated Oct. 18, 2011.
Office Action dated Apr. 26, 2012, issued in U.S. Appl. No. 12/787,138.
Final Office Action dated Oct. 11, 2012, issued in U.S. Appl. No. 12/787,138.
U.S. Appl. No. 12/787,138, Notice of Allowance dated Jan. 28, 2013.
U.S. Appl. No. 13/891,035, Office Action dated Jun. 19, 2014.
U.S. Appl. No. 13/891,035, Final Office Action dated Apr. 23, 2015.
U.S. Appl. No. 13/891,035, Notice of Allowance dated Aug. 26, 2015.
U.S. Appl. No. 13/891,035, Supplemental Notice of Allowance dated Sep. 23, 2015.
U.S. Office Action issued in issued in U.S. Appl. No. 14/952,744, dated Sep. 27, 2016.
U.S. Appl. No. 14/952,744, Final Office Action dated Aug. 25, 2017.
U.S. Office Action issued in U.S. Appl. No. 14/952,744, filed Mar. 21, 2018.
U.S. Appl. No. 14/952,744, Office Action dated Nov. 21, 2018.
Notice of Allowance dated Jun. 14, 2019 issued in U.S. Appl. No. 14/952,744.
CN patent application No. 201080023257.9, Chinese Office Action dated Dec. 12, 2013.
CN patent application No. 201080023257.9, Chinese Office Action dated Oct. 21, 2014.
CN patent application No. 201080023257.9, Chinese Office Action dated Jun. 4, 2015.
EP patent application No. 10781153.1, Supplemental Search Report and Written Opinion dated Jan. 30, 2018.
IL patent application No. 216246, Office Action dated Jan. 20, 2016.
IL patent application No. 216246, Office Action dated Jun. 29, 2017.
JP patent application No. 2012-513226, Japanese Office Action dated Apr. 4, 2014.
Japanese Office Action dated Aug. 25, 2015, JP patent application No. 2012-513226.
WO patent application No. PCT/WO2010/036237, International Search Report and Written Opinion dated Feb. 1, 2011.
U.S. Appl. No. 13/114,413, Office Action dated Jun. 19, 2014.
U.S. Appl. No. 13/114,413, Notice to Allowance dated Jan. 22, 2015.
U.S. Appl. No. 13/114,413, Notice of Allowance dated Jun. 24, 2015.
WO patent application No. PCT/US2011/037767, International Search Report and Written Opinion dated Jan. 16, 2012.
U.S. Appl. No. 13/277,821, Office Action dated Feb. 25, 2013.
U.S. Appl. No. 13/277,821, Office Action dated Oct. 11, 2013.
U.S. Appl. No. 13/277,821, Office Action dated Apr. 10, 2014.
U.S. Appl. No. 13/277,821, Final Office Action dated Nov. 20, 2014.
U.S. Appl. No. 13/277,821, Decision on Appeal dated Oct. 18, 2016.
U.S. Appl. No. 13/277,821, Notice of Allowance dated Jan. 4, 2017.
U.S. Appl. No. 13/277,821, Notice of Allowance dated Jun. 1, 2017.
U.S. Office Action dated Apr. 16, 2019, issued in U.S. Appl. No. 15/694,470.
TW Office Action issue in Application No. 100138369, dated Dec. 22, 2015.
TW Office Action dated Nov. 13, 2017 issued in Application No. 105142724.
WO patent application No. PCT/US2011/057159, International Search Report and Written Opinion dated Jun. 11, 2012.
Office Action dated Dec. 7, 2012 in U.S. Appl. No. 13/277,620.
Office Action dated Aug. 29, 2013 in U.S. Appl. No. 13/277,620.
Final Office Action dated Mar. 28, 2014 in U.S. Appl. No. 13/277,620.

(56) References Cited

OTHER PUBLICATIONS

Office Action dated Nov. 4, 2014 in U.S. Appl. No. 13/277,620.
Notice of Allowance dated Jul. 31, 2015 in U.S. Appl. No. 13/277,620.
Office Action dated Dec. 31, 2015 in U.S. Appl. No. 14/928,576.
Office Action dated Jun. 21, 2016 in U.S. Appl. No. 14/928,576.
Notice of Allowance dated Oct. 6, 2016 in U.S. Appl. No. 14/928,576.
U.S. Office Action dated May 16, 2018, issued in U.S. Appl. No. 15/608,829.
U.S. Final Office Action dated Dec. 21, 2018 issued in U.S. Appl. No. 15/608,829.
CN Office Action issued in Application No. 201180057806.9, dated Mar. 30, 2015.
Second Chinese Office Action issued in Application No. 201180057806.9, dated Nov. 19, 2015.
EP Extended Search Report dated Nov. 19, 2015, issued in Application No. 11835170.9.
JP Notice of Reasons for Rejection dated Sep. 8, 2015, in Application No. 2013-535103.
JP Notice of Reasons for Rejection dated Sep. 6, 2016, in Application No. 2013-535103.
JP Office Action dated Oct. 2, 2018, issued in Application No. 2017-147013.
KR Notice of Reasons for Rejection dated Feb. 27, 2017 in Application No. 10-2013-7012809.
KR Notice of Reasons for Rejection dated Oct. 21, 2017 in Application No. 10-2013-7012809.
KR Notification of Provisional Rejection dated Apr. 17, 2019 in Application No. 10-2018-7013041.
TW Office Action dated Nov. 13, 2015, in Application No. 100138361.
WO International Search Report and Written Opinion dated Jun. 28, 2012, issued in Application No. PCT/US2011/057158.
Pre-Issuance Submission by Third Party dated Jan. 21, 2014, received in U.S. Appl. No. 13/540,484.
U.S. Appl. No. 13/914,491, Office Action dated Jan. 8, 2016.
U.S. Appl. No. 13/540,484, Notice of Allowance dated Feb. 12, 2018.
CN Office Action issued in Application No. 201280038037.2 dated Aug. 5, 2015.
CN Office Action issued in application No. 201280038037.2, dated May 26, 2016.
CN Office Action issued in Application No. 201280038037.2 dated Feb. 6, 2017.
EP Search Report issued in Application No. 12807729.4 dated Feb. 5, 2015.
EP Search Report issued in Application No. 12807729.4 dated Jun. 2, 2015.
EP Search Report issued in Application No. 12807729.4 dated Jan. 11, 2017.
JP Office Action issued in application No. 2014-519238, dated May 31, 2016.
JP Office Action issued in Application No. 2014-519238 dated Feb. 7, 2017.
KR patent application No. 10-2014-7002762, Office Action dated Jul. 27, 2018.
KR Search Report issued in Application No. 10-2014-7002762 dated May 9, 2019.
Notice of final Rejection issued in Application No. 10-2014-7002762 dated Sep. 17, 2019.
WO patent application No. PCT/US2012/045313, International Search Report and Written Opinion dated Jan. 21, 2013.
U.S. Appl. No. 14/710,103, Office Action dated May 22, 2017.
U.S. Appl. No. 14/710,103, Notice of Allowance dated Oct. 27, 2017.
U.S. Office Action dated Oct. 22, 2019 in U.S. Appl. No. 15/887,809.
U.S. Notice of Allowance dated Feb. 10, 2020 in U.S. Appl. No. 15/887,809.
CN Office Action dated Aug. 31, 2018 for Application No. 201580032057.2.
CN Office Action dated Mar. 20, 2019, issued in Application No. 201580032057.2.
CN Office Action dated Sep. 20, 2019, issued in Application No. 201580032057.2.
CN Notification to Grant dated Mar. 6, 2020, issued in Application No. 201580032057.2.
European Extended Search Report dated Dec. 22, 2017, issued in Application No. 15791953.1.
JP Office Action dated May 28, 2019, issued in Application No. 2016-567613.
JP Office Action dated Apr. 7, 2020 issued in Application No. 2016-567613.
TW Office Action dated Nov. 19, 2018 for Application No. 104115079.
International Search report and Written Opinion dated Aug. 10, 2015, issued in Application No. PCT/US15/30336.
U.S. Appl. No. 11/837,291, Office Action dated Feb. 18, 2009.
U.S. Appl. No. 11/837,291, Office Action dated Oct. 26, 2009.
U.S. Appl. No. 11/837,291, Office Action dated Jan. 7, 2010.
U.S. Appl. No. 11/837,291, Office Action dated Apr. 22, 2010.
U.S. Appl. No. 11/837,291, Notice of Allowance dated Aug. 10, 2010.
U.S. Appl. No. 12/895,424, Office Action dated Nov. 17, 2010.
EP patent application No. 08831531.2, European Search Report dated Oct. 27, 2010.
Aifantis et al., "High energy density lithium batteries", 2010 Wiley-VCH Verlag GmbH & Co. KGaA, Weinheim (Chapter 6: Next-generation anodes for secondary Li-Ion batteries).
Baldwin, Richard K., et al. "Solution reduction synthesis of surface stabilized silicon nanoparticles," The Royal Society of Chemistry 2002, Chem. Commun., 2002, 1822-1823.
Bierman, et al., "Potential applications of hierarchical branching nanowires in solar energy conversion," Energy & Environmental Science, vol. 2, No. 10, Jan. 1, 2009 (Jan. 1, 2009), pp. 1050-1059.
Campbell et al., "Preparation of mesoporous silica templated metal nanowire films on foamed nickel substrates," Microporous and Mesoporous Materials 97, 2006, 114-121.
Carbon nanofiber product sheet, Applied Science 2008, downloaded from http://www.apsci.com/ngm-pyrol.html on May 2011.
Chan, C.K., et al., "High Capacity Li Lon Battery Anodes Using Ge Nanowires", Nano Letters, 2008, vol. 8, No. 1, 307-309.
Chan, C.K., et al., High-Performance Lithium Battery Anodes Using Silicon Nanowires, Nature, vol. 3, Jan. 2008.
Chan, Candace K. et al., "Structural and electrochemical study of the reaction of lithium with silicon nanowires," Journal of Power Sources 189 (2009) 34-39.
Chan, Candace K. et al., "Surface chemistry and morphology of the solid electrolyte interphase on silicon nanowire lithium-ion battery anodes," Journal of Power Sources 189 (2009) 1132-1140.
Chaudhari, P. et al. "Heteroepitaxial silicon film growth at 600 degree C for an Al—Si eutectic melt," Thin Solid Films 518 (2010) 5368-5371.
Che, G., et al., "Carbon Nanotubule Membranes for Electrochemical Energy Storage and Production", Nature 393, 346-349 (1998).
Cheng Mu et al., "Silicon nanotube array/gold electrode for direct electrochemistry of cytochrome e," J. Phys. Chem, B 2007, 111, 1491-1495, Nov. 21, 2006.
Cui, Yi et al., "Doping and electrical transport in silicon nanowires", The Journal of Physical Chemistry, vol. 104, No. 22, Jun. 8, 2000.
Cui, Li-Feng et al., "Carbon-silicon core-shell nanowires as high capacity electrode for lithium ion batteries," Nano Letters, published on Aug. 5, 2009 on http://pubs.acs.org.
Cui, Li-Feng et al., "Crystalline-amorphous core-shell silicon nanowires for high capacity and high current battery electrodes," Nano Letters, 2009, vol. 9, No. 1 491-495, Dec. 23, 2008.
Dick, et al. A New Understanding of Au-Assisted Growth of III-V Semiconductor Nanowires, Adv. Funct. Mater. 15, 1603-1610 (2005).
Doerk et al., "Growth of branching Si nanowires seeded by Au—Si surface migration," Journal of Materials Chemistry, vol. 18, No. 44, Jan. 1, 2008 (Jan. 1, 2008), pp. 5376-5381.
Emmenegger, et al., "Carbon Nanotubes Synthesized on Metallic Substrates," Applied Surface Science, Aug. 1, 2000, pp. 452-456.
Esmanski, Alexei et al., "Silicon inverse-opal-based macroporous materials as negative electrodes for lithium ion batteries," Advanced Functional Materials, 2009, 1999-2010, May 7, 2009.

(56) References Cited

OTHER PUBLICATIONS

For high-performance anode material in lithium-ion batteries, After Gutenberg, downloaded from http://jcwinnie.biz/wordpress/?p=2864 on Dec. 25, 2009.
Frackowiak, E., et al., "Electrochemical Storage of Lithium Multiwalled Carbon Nanotubes," *Carbon* 37, 1999, pp. 61-69.
Gao, et al., "Alloy formation in nanostructured silicon." Adv. Mater. 13, 816-819 (2001).
Givargizov, "Fundamental aspects of VLS growth," Journal of Crystal Growth 31, 20-30 (1975).
Goldstein et al., "Melting in semiconductor nanocrystals," Science 256, 1425-1427 (Jun. 1992).
Green, M., et al. "Structured silicon anodes for lithium battery applications. Electrochem," Solid State Lett. 6, A75-A79 (2003).
Hertzberg et al., "Abstract SiC nanotubes Cu foil," J. Am. Chem. Soc., 2010, 8548-8549.
Hertzberg et al., "Deformations in Si—Li anodes upon electrochemical alloying in nano-confined space," J. Am. Chem. Soc. 2010, 132, 8548-8549, Apr. 15, 2010.
Hu L., et al., "Si nanoparticle-decorated Si nanowire networks for Li-ion battery anodes," The Royal Society of Chemistry, Chem, Commun., 2011, 47, 367-369.
Huang et al., Catalytic Growth of Zinc Oxide Nanowires by Vapor Transport, Adv. Mater., 13, 113-116 (2001).
Huggins, R.A. & Nix, W.D. Decrepitation Model for Capacity Loss During Cycling of Alloys in Rechargeable Electrochemical Systems, Ionics 6, 57-63 (2000).
Huang et al., "Fabrication of Silicon Nanowire Arrays with Controlled Diameter, Length, and Density," Adv. Mater., (2007), 19, 744-748.
Jie Xiao, et al., "Stabilization of silicon anode for Li-ion batteries," Journal of the Electrochemical Society, 157 (10) A1047-A1051, Aug. 2, 2010.
Kang, Kubum et al., "The role of NiOx overlayers on spontaneous growth of NiSix nanowires from Ni seed layers," Nano Letters 2008, vol. 8, No. 2 431-436, Jan. 12, 2008.
Kang, Kibum et al., "Unconventional roles of metal catalysts in chemical-vapor syntheses of single-crystalline nanowires," Journal of Applied Physics 105, 122407 (2009).
Kasavajjula, et al., "Nano- and bulk-silicon-based insertion anodes for lithium-ion secondary cells," J. Power Sources, 163, 2007, pp. 1003-1339.
Kim, Cheol-Joo et al., "Spontaneous chemical vapor growth of NiSi nanowires and their metallic properties," Advanced Materials, 2007, 19, 3637-3642, Oct. 16, 2007.
Kim Hyesun, et al., "Superior Lithium Electroactive Mesoporous Si@Carbon CoreShell Nanowires for Lithium Battery Anode Material," American Chemical Society, Nano Letters, 2008, vol. 8, No. 11, pp. 3688-3691.
Kim, Hyunjung et al., "Three-dimensional porous silicon particles for use in high-performance lithium secondary batteries," Angewandte Chemie, Int. Ed. 2008, 47, 10151-10154, Nov. 17, 2008.
Lee, Y.M., et al. "SEI layer formation on amorphous Si thin electrode during precycling," J. Electrochem., Soc. 154, A515-A519 (2007).
Lee et al., "Anomalous growth and characterization of carbon-coated nickel silicide nanowires," Chemical Physics Letters 384, 2004, pp. 215-218.
Levitt, "Whisker Technology." Wiley Interscience, 1970.
Li et al., "A high capacity nano-Si composite anode material for lithium rechargeable batteries," Electrochemical and Solid-State Letters, 2 (11) 547-549 (1999).
Li et al., "Freestanding mesoporous quasi-single-crystalline Co3O4 nanowire arrays," J. Am. Chem. Soc. 2006, 128, 14258-14259, Oct. 18, 2006.
Li et al., "Rate capabilities of nanostructured LiMn2O4 electrodes in aqueous electrolyte." J. Electrochem, Soc. 147, 2044-2049 (2000).
Magasinki, A. et al., "High-performance lithium-ion anodes using a hierarchical bottom-up approach," Nature Materials, published online at www.nature.com/naturematerials Mar. 14, 2010.

Magasinski et al., "Hierarchical bottom-up approach for high-performance Si-based Li-ion battery anodes," Abstract #16, IMLB 2010, The Electrochemical Society.
Magasinski et al., "Towards efficient binders for Li-ion battery Si-based anodes," Abstract #64, IMLB 2010, The Electrochemical Society.
Marczak et al., "The individual core/shell silicon nanowire structure probed by Raman Spetroscopy," Phys. Status Solidi C 6 No. 9, 2053-2055, 2009.
Morales, et al., A Laser Ablation Method for the Synthesis of Crystalline Semiconductor Nanowires, Science vol. 279, Jan. 9, 1998.
Nickel Silicide Nanobelts and Sheets in Li-ion Anodes Capacity, Green Car Congress, Apr. 19, 2009, pp. 1-3.
Nishi, Yoshio, "Lithium ion secondary batteries; past 10 years and the future," *Journal of Power Sources*, vol. 100, 2001, pp. 101-106.
Pan et al., Nanobelts of Semiconduction Oxides, *Science* Mar. 9, 2001: 1947-1949.
Park, M.S. et al., "Preparation and Electrochemical Properties of SnO2 Nanowires for Application in Lithium-ion Batteries" Angew. Chem, Int. Ed. 46, 750-753 (2007).
Park, Mi-Hee et al., "Silicon nanotube battery anodes," Nano Letters 2009, vol. 9, No. 11 3844 3847, Sep. 11, 2009.
Park, Mi-Hee et al., "Supporting information for silicon nanotube battery anodes," Sep. 11, 2009.
Ping-Ping, F., et al., Amorphous Silicon Film Anode for Lithium-ion Battery, Chinese Journal of Inorganic Chemistry, vol. 22, No. 10, Oct. 2006, 5 pages.
Quasi-2D Structures Make Better Batteries, Tyrell, James, Apr. 17, 2008, pp. 1-2.
Ryu, J.H., et al., "Failure modes of silicon powder negative electrode in lithium secondary batteries," Electrochemical. & Solid-State Letts. 7, A306-A309 (2004).
Sharma et al., "Diameter control of Ti-catalyzed silicon nanowires," Journal of Crystal Growth 267 (2004) 613-618, Apr. 20, 2004.
Sharma et al., "Structural characteristics and connection mechanism of gold-catalyzed bridging silicon nanowires," Journal of Crystal Growth 280 (2005) 562-568.
Sharma et al., "Thermodynamic properties of the lithium-silicon system." Journal of the Electrochemical Society 123, 1763-1768 (Dec. 1976).
S.K. Samudrala and S. Bandyopadhyay: Hybrid Nanocomposite for Nanotechnology, 2009, p. 245.
Softpedia, "Silicon can improve lithium-ion batteries," downloaded from http://news.softpedia.com/news/silicon-can-improve-lithium-ion-batteries-161142.shtml on Oct. 21, 2010.
Song et al., "Arrays of sealed silicon nanotubes as anodes for lithium ion batteries," Nano Letters, American Chemical Society, Jan. 11, 2010.
"Sweet nanotech batteries: Nanotechnology could solve lithium battery charging problems," PhysOrg.com, Received online Mar. 23, 2012 from http://phys.org/news127043619.html.
Sun et al., Synthesis of Nickel Mono-Silicide Nanowire by Chemical Vapor Deposition on Nickel Film: Role of Surface Nickel Oxides, Japanese Journal of Applied Physics, vol. 48, No. 4, Apr. 1, 2009, p. 84C138, XP855323364.
Uehara et al., "Thick vacuum deposited silicon fdms suitable for the anode of Li-ion battery," Journal of Power Sources 146, 441-444 (2005).
Westwater et al., "Growth of silicon nanowires via gold/silane vapor-liquid-solid reaction," Journal Va. Sci. Technology B 15(3), 554-557 (May/Jun. 1997).
Wu, Y. et al. Controlled growth and structures of molecular-scale silicon nanowires. Nao Lett. 4, 433-436 (2004).
Ying et al., "Characterization of SnO$_2$ nanowires as anode materials for Li-ion batteries." Applied Physics Letters 87(11), 2005 (Abstract only).
Zhang, et al., "Pyrolytic Carbon-coated Silicon/Carbon Nanotube Composites: Promising Application for Li-ion Batteries," *Int. J. Nanomanufacturing*, vol. 2, Nos. 1/2, 2008, pp. 4-15.

(56) References Cited

OTHER PUBLICATIONS

Zhang, Hong-Li et al., "The facile synthesis of nickel silicide nanobelts and nanosheets and their application in electrochemical energy storage," Nanotechnology 19 (2008) 165606, (7 pp), Mar. 20, 2008.X.

Zhou, Controlled Li Doping of Si Nanowires (Applied Physics Letters vol. 75, No. 16), Oct. 18, 1999.

"Low Pressure Chemical Vapor Deposition Systems," 2020, https://www.mksinst.com/n/lpcvd-systems, 3 pages.

U.S. Corrected Notice of Allowability dated Feb. 12, 2021, issued in U.S. Appl. No. 16/264,456.

U.S. Notice of Allowance dated Jan. 25, 2021, issued in U.S. Appl. No. 16/264,456.

U.S. Office Action dated Sep. 20, 2020, issued in U.S. Appl. No. 16/264,456.

U.S. Final Office Action dated Dec. 31, 2019, issued in U.S. Appl. No. 15/694,470.

U.S. Notice of Allowance dated May 21, 2020, issued in U.S. Appl. No. 16/109,609.

U.S. Office Action dated Oct. 9, 2020, issued in U.S. Appl. No. 15/694,470.

Westra, et al. "Formation of thin-film crystalline silicon on glass observed by in-situ XRD," Energy Procedia 2, 2010, pp. 235-241.

Yazawa et al., "Effect of one monolayer of surface gold atoms on the epitaxial growth of InAs nanowhiskers," Appl. Phys. Lett. 61 (17), 2051-2053 (Oct. 1992).

U.S. Appl. No. 16/949,201, filed Oct. 19, 2020, Cui et al.

U.S. Appl. No. 16/748,393, filed Jan. 21, 2020, Fasching et al.

U.S. Appl. No. 16/797,553, filed Feb. 21, 2020, Yu et al.

U.S. Notice of Allowance dated Jun. 9, 2020 in U.S. Appl. No. 15/887,809.

Israel Office Action dated Aug. 10, 2015, IL patent application No. 216246.

JP Office Action dated Nov. 30, 2020 issued in Application No. 2016-567613.

WO International Search report and Written Opinion dated Jun. 17, 2020, issued in Application No. PCT/US2020/019282.

Wang, Y., et al. Epitaxial growth of silicon nanowires using an aluminum catalyst. Nature Naotech. 1, 186-189 (2006).

Ulvestad, A., et al. "Long-term Cyclability of Substoichiometric Silicon Nitride thin Film Anodes for Li-ion Batteries," Scientific Reports DOI: 10.1038/s41598-017-13699-0, Oct. 17, 2017, pp. 1-10.

U.S. Appl. No. 17/323,575, filed May 18, 2021, Loveness et al.

U.S. Final Office Action dated Jul. 2, 2021, issued in U.S. Appl. No. 15/694,470.

\* cited by examiner

STRUCTURALLY CONTROLLED DEPOSITION OF SILICON ONTO NANOWIRES

CROSS-REFERENCE TO RELATED APPLICATIONS

This application is a divisional of application Ser. No. 15/887,809, filed on Feb. 2, 2018 (now U.S. Pat. No. 10,707,484), which is a continuation of application Ser. No. 14/710,103, filed on May 12, 2015 (now U.S. Pat. No. 9,923,201), which claims benefit to the provisional application No. 61/992,121, filed on May 12, 2014, each of which is incorporated by reference in its entirety for all purposes.

STATEMENT OF GOVERNMENT SUPPORT

The invention described and claimed herein was made in part utilizing funds supplied by the U.S. Department of Energy under Contract No. DE-EE0005474. The Government has certain rights in this invention.

BACKGROUND OF THE INVENTION

Field of the Invention

This invention relates generally to nanostructures, and, more specifically, to multilayered silicon nanowire structures that are useful in battery anodes.

Much work has been done to find a way to use silicon in lithium battery anodes. Silicon holds much promise as it has ten times the lithium capacity as currently-used graphite. But, unfortunately, in absorbing so much lithium, silicon swells by 400%, which usually results in crumbling of the silicon and a short battery lifetime.

SUMMARY

In one aspect an anode for a lithium battery is provided, the anode including a substrate; a nanowire template rooted to the substrate; a first silicon layer substantially coating the nanowire template, the first silicon layer having a first density; and a second silicon layer over the first silicon layer and any exposed nanowire template, the second silicon layer having a density higher than the density of the first silicon layer. According to various embodiments, the first density may be less than 2.2 g/cm$^3$, 2.1 g/cm$^3$, 2.0 g/cm$^3$, 1.9 g/cm$^3$, 1.8 g/cm$^3$, or 1.7 g/cm$^3$. The second silicon layer may have a density greater than 2.25 g/cm$^3$ in some embodiments. In some embodiments, the second silicon layer has a density at least 0.05 g/cm$^3$ greater or 0.15 g/cm$^3$ than that of the first silicon layer.

The first silicon layer may be non-conformal to the nanowire template. In some embodiments, the second silicon layer is conformal to the underlying surface. In some embodiments, the hydrogen content of the first silicon layer is at least 10%. In the same or other embodiments, the hydrogen content of the second silicon layer may be no more than 5%. According to various embodiments, the nanowire template may be conductive and can include silicide nanowires. An example is a nickel silicide nanowire template.

In some embodiments, the first silicon layer is between about 5 and 20 microns thick at its maximum diameter. In some embodiments, the second silicon layer is between about 5 and 500 nanometers thick, e.g., between about 5 and 100 nanometers thick.

Another aspect of the disclosure relates to a lithium battery including an anode as described above, a lithium-containing cathode, and an electrolyte in ionic communication with both the anode and the cathode.

Another aspect of the disclosure relates to a nanostructure including a first silicon layer having a first density; and a second silicon layer over the first silicon layer, the second silicon layer having a density higher than the density of the first silicon layer. According to various embodiments, the first density may be less than 2.2 g/cm$^3$, 2.1 g/cm$^3$, 2.0 g/cm$^3$, 1.9 g/cm$^3$, 1.8 g/cm$^3$, or 1.7 g/cm$^3$. The second silicon layer may have a density greater than 2.25 g/cm$^3$ in some embodiments. In some embodiments, the second silicon layer has a density at least 0.05 g/cm$^3$ greater or 0.15 g/cm$^3$ than that of the first silicon layer. In some embodiments, the nanostructure includes a nanowire within the first silicon wire. The nanowire may be growth-rooted to the substrate.

Yet another aspect of the disclosure relates to method of making an anode for a lithium battery, including providing a substrate; growing nanowires from the substrate, depositing a first silicon layer over the nanowires using a PECVD method; and depositing a second silicon layer over the first silicon layer, the nanowires, and the substrate using a thermal CVD method. In some embodiments, the nanowires are silicide nanowires. In some embodiments, the PECVD method is an expanding thermal plasma (ETP) method.

These and other aspects are described further below with reference to the figures.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
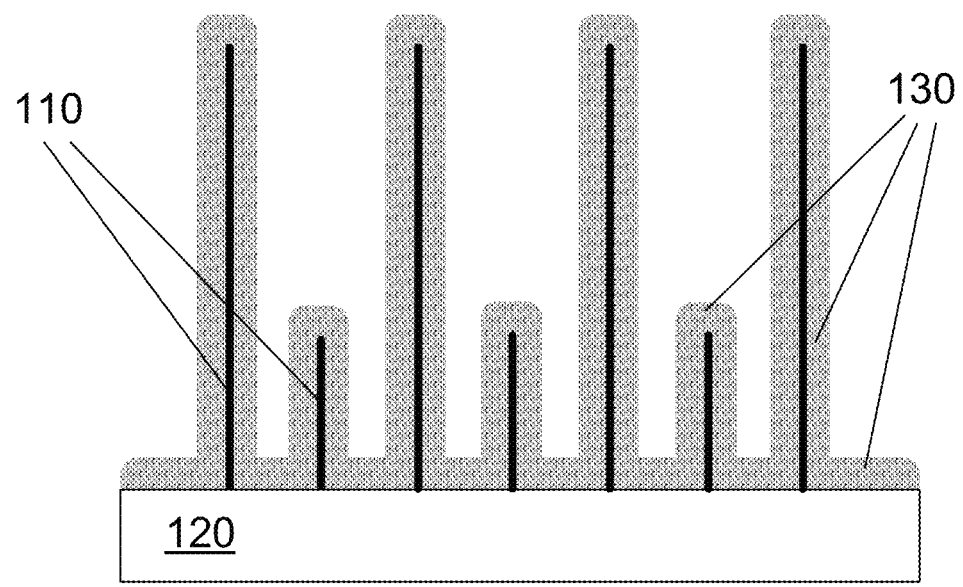
FIG. 1 is a schematic illustration of nanowires over which a silicon layer has been deposited using thermal CVD (chemical vapor deposition).

Certain embodiments are illustrated in the context of silicon deposition onto silicide nanowires. The skilled artisan will readily appreciate, however, that the materials and methods disclosed herein will have application in a number of other contexts where it is useful to adjust deposition to produce layers with specific characteristics. For example, various embodiments are described herein with reference to nanowires. It should be understood, however, that unless otherwise stated, the references herein to nanowires include other types of nanostructures as described in U.S. Pat. No. 8,257,866, incorporated by reference herein, such as nanotubes, nanoparticles, nanospheres, nanorods, nanowhiskers, and the like.

Generally, the term "nanostructures" refers to structures having at least one dimension that is less than about 1 micron. This dimension could be, for example, a diameter of the nanostructure (e.g., a silicide template nanowire), a thickness of the shell formed over a template (e.g., a thickness of the amorphous silicon layers), or some other nanostructure dimension. It should be understood that any of the overall dimensions (length and diameter) of the final coated structure do not have to be at a nanoscale. For example, a final structure may include a layer that is about 10 microns in thickness at its greatest diameter and coated over a template that is about 100 nanometers in diameter and 20 microns in length. While this overall structure is about 10.1 microns at its greatest diameter and 20 microns in length, it could be generally referred to as a "nanostructure" because of the dimensions of the template. In specific embodiments, the term "nanowire" refers to structures with nano-scaled shells positioned over elongated template structures.

Nanowires (as a specific case of nanostructures) have an aspect ratio of greater than one, typically at least about two and more frequently at least about four. In specific embodiments, nanowires have an aspect ratio of at least about 10 and even at least about 100 or 500. Nanowires may make use of their one larger dimension to connect to other electrode components (e.g., a conductive substrate, other active material structures, or conductive additives). For example, nanowires may be substrate rooted such that one end (or some other part) of the majority of the nanowires is in contact with the substrate. Because the two other dimensions are small and there is an adjacent void volume available for expansion, the internal stress built up in the nanowires during lithiation (e.g., expansion of the nano-shells positioned over the silicide templates) is also small and does not break apart the nanowires (as happens with larger structures). Certain dimensions of the nanowires (e.g., an overall diameter and/or a shell thickness) are kept below the corresponding fracture levels of the active material used. Nanowires also permit a relatively high capacity per unit area of the electrode surface due to their elongated structure, which corresponds to the height of the template structure. This results from their relatively high aspect ratio and terminal connection to the substrate.

Silicon nanostructures can be made by first growing a nanowire template structure that is not pure silicon and then coating the template with silicon. Thermal CVD (chemical vapor deposition), HWCVD (hot-wire CVD), and/or PECVD (plasma enhanced chemical vapor deposition) may be used to deposit the silicon.

Various deposition processes produce different profiles when depositing silicon onto nanowires. For example, thermal CVD creates a conformal amorphous Si coating. HWCVD (also known as catalytic CVD) makes a high density, non-conformal amorphous Si coating that is thicker at the tips of the nanowires and thinner at the roots of the nanowires near the substrate. PECVD also produces non-conformal amorphous Si coating that is thicker at the ends of the nanowires and thinner at the roots of the nanowires near the substrate, but the coating has a low density with many small voids.

FIG. 1 is a schematic illustration of nanowires over which a conformal silicon layer has been deposited using thermal CVD. A nanowire template 110 is grown from a substrate 120. A silicon layer 130 is deposited onto the nanowire template 110. Note that the silicon layer 130 coats both the nanowire template 110 and the substrate 120, and that the coating has approximately the same thickness everywhere.

One advantage for the structure shown in FIG. 1 is that its structure is very dense. When an anode made using such a structure is cycled in a battery, the solid electrolyte interface (SEI) layer that forms on the silicon is very thin as the silicon formed by thermal CVD is very dense. One of the disadvantages for the structure shown in FIG. 1 is the thick layer of silicon at the roots of the nanowires. When an anode made using such a structure is cycled in a battery, there is great expansion and contraction in the silicon layer. Expansion in the root area can induce wrinkling of the Si layer and delamination of the nanowires, causing battery failure. Another disadvantage occurs because the nanowires in the template may not be exactly parallel as shown in FIG. 1. Instead, they grow at different angles and very often grow in clusters. The nanowires do not all have the same length. When coated by thermal CVD, the root area of the clusters, together with some short nanowires, can form a continuous silicon layer, which also can lead to delamination.

Figure 2:
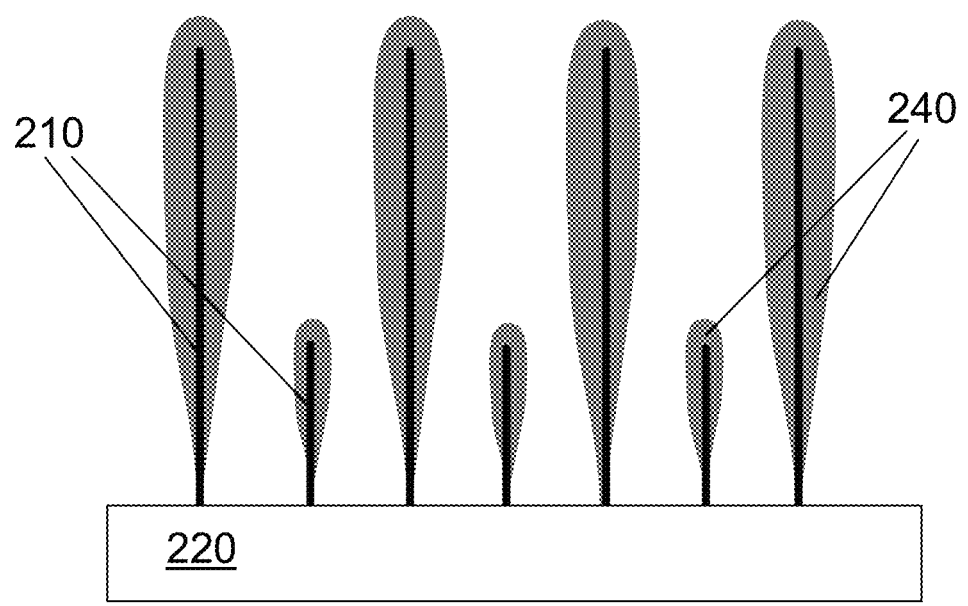
FIG. 2 is a schematic illustration of nanowires over which a silicon layer has been deposited using PECVD (plasma enhanced chemical vapor deposition).

FIG. 2 is a schematic illustration of nanowires over which a silicon layer has been deposited using PECVD. Initially, PECVD may deposit a very thin layer (less than 1 micron and typically much less than 1 micron, such as 0.1-0.4 microns) of silicon on the substrate and at the roots of the nanowires. However, these areas are quickly shadowed by subsequent deposition at the tips of the nanowires. Depending on nanowire uniformity across the substrate surface, the very thin layer on the substrate may or may not be continuous. Under ideal surface and deposition conditions, a uniform thin layer may be expected but in practical cases, at the substrate-nanowire interface, there may be a discontinuity due to non-uniform distribution of nanowires on the surface.

In FIG. 2, a nanowire template 210 is grown from a substrate 220. A silicon layer 240 is deposited onto the nanowire template 210. Note that the silicon layer 240 is thickest at the tips of the nanowires of the nanowire template 210 and tapers off until there is essentially no silicon at the roots of nanowires. There is essentially no silicon on the substrate 220 either.

One advantage for the structure shown in FIG. 2 is that the root areas of the nanowires are coated only with only this very thin silicon layer. When an anode made using such a structure is cycled in a battery, the possibility of failure caused by expansion at the nanowire root area is greatly reduced. Another advantage is that PECVD coatings are not as dense as thermal CVD coatings; they can contain a large volume of voids and pores. Such defects can be very helpful in providing space into which the silicon can expand as it absorbs lithium.

One of the disadvantages of the structure shown in FIG. 2 is that the root area of the nanowires is not coated effectively. When an anode made using such a structure is cycled in a battery, the regions around the roots cannot participate electrochemically, thus causing a reduction in volumetric energy density of the battery. If more silicon were deposited onto the nanowires, the silicon layer at the tips of the nanowires would be too thick, causing fracturing of the silicon during cycling and subsequent anode failure. Another disadvantage is that the presence of voids can lead to large surface area of the coated nanowires and water absorption within the layer or at the surface. Very thick SEI layers can form as the battery is cycled, thus reducing the columbic efficiency and shortening the cycle life of the battery.

Figure 3:
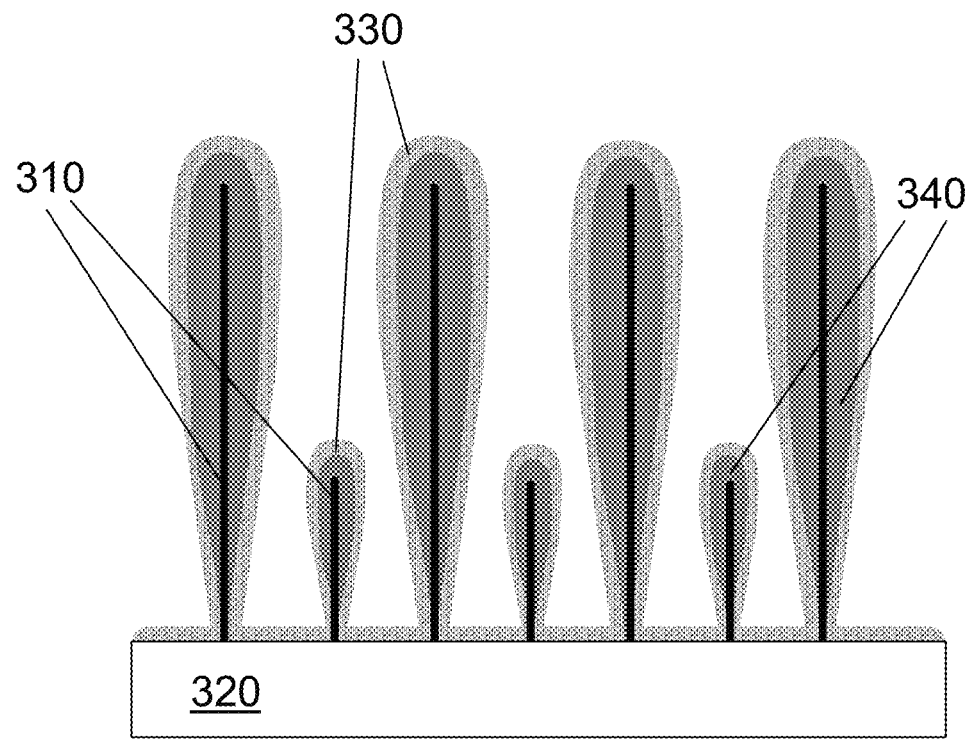
FIG. 3 is a schematic illustration of nanowires over which a first silicon layer has been deposited using PECVD and then a second silicon layer has been deposited using thermal CVD, according to an embodiment of the invention.

In one embodiment of the invention, the deposition methods discussed above are combined to provide optimum Si coatings as shown in FIG. 3 which is a schematic illustration of nanowires over which two silicon layers have been deposited. A nanowire template 310 is grown from a substrate 320. A first silicon layer 340 with a tapered profile is deposited onto the nanowire template 310 using PECVD. The first silicon layer 340 may be between about, for example, 0.5 and 10 microns thick at the top of the nanowire. In some embodiments, the first silicon layer may be thicker, e.g., between about 10 to 50 microns, or 10-20 microns. A second silicon layer 330 with a conformal profile is deposited onto the top of first silicon layer 340 using thermal CVD. The second silicon layer 330 may be, for example, between about 10 and 500 nm thick. The resulting structure has much more silicon at the tips of the nanowires than at the root ends. In more particular embodiments, the second silicon layer may be between 5 and 200 nm thick, or 10 to 90 nm thick. The second silicon layer 330 is conformal to the underlying surface, which includes the first silicon layer 340, the substrate 320, and any exposed portions of the nanowire template 310. As noted above, it has approximately uniform thickness.

According to various embodiments, the layer on the substrate surface may or may not be continuous. High performance may be achieved unless the layer on the substrate is too thick (e.g., greater than 2 microns) and continuous.

Figure 4:
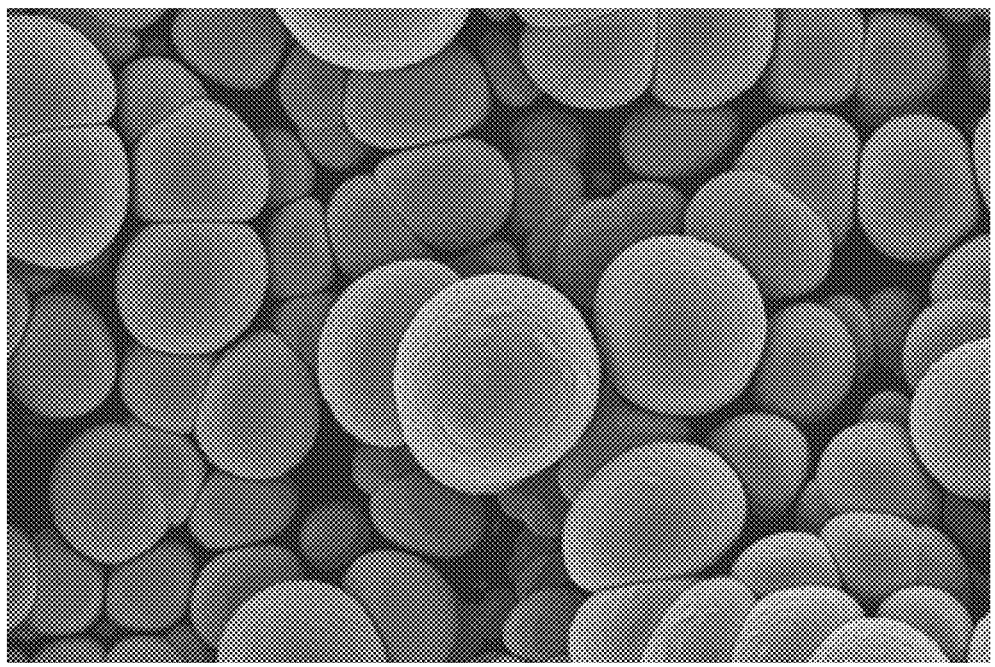
FIG. 4 is a SEM (scanning electron microscope) top-view image of nanowires over which a silicon layer has been deposited using PECVD.

FIG. 4 is a SEM (scanning electron microscope) top-view image of nanowires over which a silicon layer has been deposited using PECVD.

Figure 5:
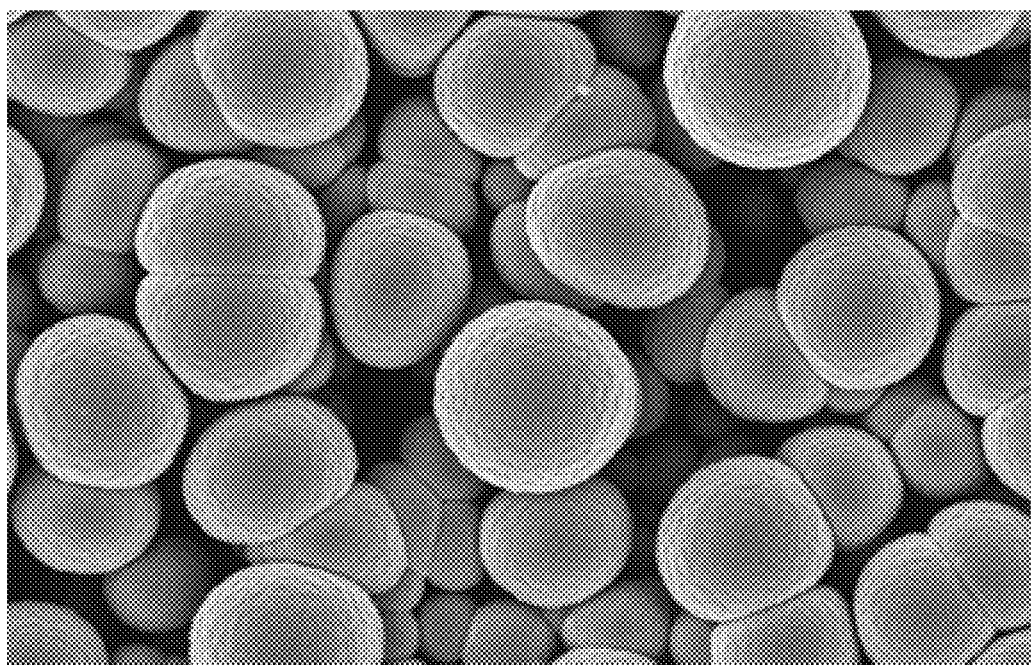
FIG. 5 is a SEM top-view image of nanowires over which a first silicon layer has been deposited using PECVD and then a second silicon layer has been deposited using thermal CVD, according to an embodiment of the invention.

FIG. 5 is a SEM top-view image of nanowires over which a first silicon layer has been deposited using PECVD and then a second silicon layer has been deposited using thermal CVD.

The novel structures described herein have many advantages. In some embodiments, there is more silicon near the tip of the nanowire than at the root, but there is still some silicon at the root. Having such a thin silicon layer at the root ensures that delamination does not occur during cycling. In some embodiments, there may also be electrochemical participation throughout the entire length of the nanowire. Further, SEI layer formation may be stabilized.

In some embodiments, the first silicon layer deposited is amorphous and has a low density, such as a density of about 1.70 g/cm$^3$ or less, or 2.10 g/cm$^3$ or less, or 2.2 g/cm$^3$ or less, or less than 2.25 g/cm$^3$ and may include many small voids. The second silicon layer deposited is amorphous and has a high density, such as a density of about 2.25 g/cm$^3$ or more. The density of each layer is less than that of crystalline silicon.

According to various embodiments, the nanostructures may be characterized by a second silicon layer over a first silicon layer, the second silicon layer having a density higher than the density of the first silicon layer. As discussed above, in some embodiments, the first silicon layer provides space into which the silicon can expand as it absorbs lithium, while the second silicon layer reduces SEI layer formation. As such, the densities of each layer may be adjusted depending on the electrolyte, capacity of the battery, nanowire template density, etc. Accordingly, in some embodiments, the densities may be characterized in terms of a difference between densities of the layers, rather than or in addition to by absolute density. In some embodiments, the second silicon layer may have a density of at least 0.05 g/cm$^3$ greater than the first silicon layer, or at least 0.1 g/cm$^3$ greater than the first silicon layer, or at least 0.2 g/cm$^3$ than the first silicon layer, or at least 0.3 g/cm$^3$ greater than the first silicon layer.

Figure 6:
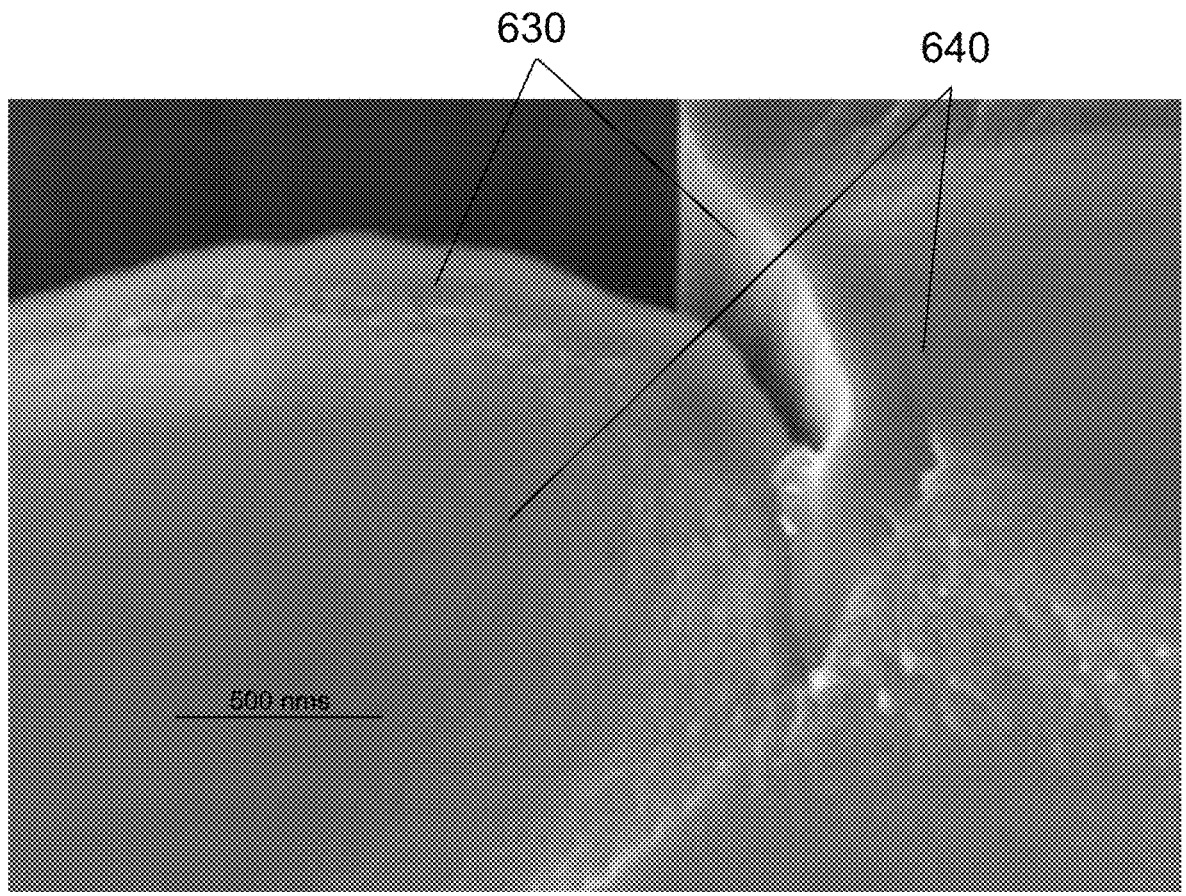
FIG. 6 is a SEM cross-section view image of a nanostructure that has an inner core of PECVD silicon and an outer layer of thermal CVD silicon, according to an embodiment of the invention.

FIG. 6 is a SEM cross-section view image of a nanostructure that has an inner core of PECVD silicon 640 and an outer layer of thermal CVD silicon 630, according to an embodiment of the invention. The porous morphology of the PECVD silicon 640 can be seen clearly as can the non-porous morphology of the thermal CVD silicon 630.

Aspects of the methods and structures disclosed herein may be implemented with other high capacity active materials, in addition to or instead of silicon. An electrochemically active material may have a theoretical lithiation capacity of at least about 500 mAh/g or, more specifically, of at least about 1,000 mAh/g. Active materials with such capacities may be referred to as "high capacity active materials." In addition to amorphous silicon, examples of high capacity active materials include silicon-containing compounds, tin and tin-containing compounds, germanium and germanium-containing compounds. For example, in some embodiments, an electrode may include a dual density germanium layer including a first inner layer having a lower density and second outer layer having a higher density.

In certain embodiments, high capacity active materials or templates are formed as substrate rooted nanostructures. These nanostructures may be physically and conductively attached to a conductive substrate, which may serve as a current collector for this electrode. The physical attachment may be more than a simple mechanical contact, which might result, for example, from coating a binder with discrete nanostructures onto the substrate. In some embodiments, the physical attachment results from fusion of the nanostructures to the substrate or deposition of the nanostructures or some portion of the nanostructures directly onto the substrate, for example, using CVD techniques or, even more, specifically using vapor-liquid-solid CVD growth. In yet another example, physical attachment results from ballistic impalement of the nanostructures onto the substrate. In certain embodiments, physical attachment includes certain forms of metallurgical bonds, such as a formation of alloys of two bonded materials (e.g., silicides).

In many embodiments, the nanowire template is a conductive material, with examples of conductive templates including metal templates and metal silicide templates. In some embodiments, a conductive template may include an oxide. As used herein, the term "conductive" refers broadly to electrical conductors, as distinct from semiconductors and insulators. The nanowire template may have conductivity of at least about $10^3$ S/m, or more specifically at least about $10^6$ S/m or even at least about $10^3$ S/m. Conductive templates can be useful to provide a transport path from the silicon electrochemically active material to a current collector as well as mechanically supporting the silicon layers. In some embodiments, however, the nanowire template may be a semiconductor or insulator (e.g., an oxide) that provides mechanical support to the silicon. Silicon nanowires may also be used as a template, with one or more coatings of a-Si deposited over the silicon nanowires as described herein. Silicon nanowire anodes are described in U.S. Pat. No. 7,816,031, incorporated by reference herein.

Nanowires of the nanowire template may be non-branched linear nanowires or branched nanowires. An electrode may include a combination of non-branched and branched nanowires, or only include only one of these types. While the templates may generally be elongated template structures, as described above, nanospheres, nanorods, nanowhiskers, nanoparticles, and the like may be employed. A nanowire template may be part of or include a multidimensional structure. One example of such a structure is a central core to which multiple nanowires are attached, forming "fuzzy ball-like" or "snowball-like" structures. An example of such a structure is shown in U.S. patent application Ser. No. 13/277,821, incorporated by reference herein.

In certain embodiments, nanowires in a nanowire template are between about 10 nanometers and 100 nanometers in diameter and between about 10 microns and 100 microns in length. In one example, a structure may include nanowires ranging from 5 to 40 microns. However, nanowires having other dimensions may be used.

Nanowire density can depend on the length of the nanowires, the desired capacity, the expansion ratio of the active material, and the particular application. If spacing between template structures is less than the coating thickness, it can cause significant interconnections of the active material layer. Interconnections near the roots can create agglomerated or continuous film like structures, which impede good cycle performance. The nanowires may be randomly distributed, with a variety of lengths and randomly-oriented. In some implementations, however, templated or guided methods of growth that produce uniform densities and/or orientations may be used. In one example, nanowires of a template structure may be grouped into various size bins, e.g., short, medium, and long sizes. Long nanowires may be identified as being visible in a top-down SEM image as depicted above. Example densities may be 0.5 to 20 long nanowires per 100 micron squared and 2 to 400 total nanowires per 100 microns squared. In some embodiments, a nanowire density may be determined for a particular mass loading. For example, for a mass loading between 2.5 and 2.9 mg/cm$^2$, a top diameter of the Si coating of 4 to 6 microns and a bottom diameter of 0.2 to 0.3 microns, a top nanowire density may be $2 \times 10^6$ to $6 \times 10^6$ long nanowires per centimeter squared.

The substrate is generally a conductive material having a conductivity of at least about $10^3$ S/m, or more specifically at least about $10^6$ S/m or even at least about $10^7$ S/m, particularly if the nanowire template is rooted to the substrate, and may be used as a current collector in the battery. This may be desirable when the substrate rooted structure is employed as a fully fabricated electrode for a battery or fuel cell. Examples of conductive substrate materials include copper, copper coated with metal oxides, stainless steel, titanium, aluminum, nickel, chromium, tungsten, other metals, metal silicides and other conductive metal compounds, carbon, carbon fiber, graphite, graphene, carbon mesh, conductive polymers, doped silicon or combinations of above including multi-layer structures. The substrate may be formed as a foil, film, mesh, foam, laminate, wires, tubes, particles, multi-layer structure, or any other suitable configuration. In certain embodiments, a substrate is a metallic foil with a thickness of between about 1 micron and 50 microns or more specifically between about 5 microns and 30 microns.

According to various embodiments, a silicon coating may be characterized by one or more of shape (also referred to as morphology), density, and bulk and surface composition. In terms of morphology, the first silicon layer may be generally characterized as non-conformal, having a thickness that is variable in the direction vertical to the substrate.

In some embodiments, a silicon layer has a generally circular symmetry. See, e.g., the top view SEM image in FIG. 4. It should be noted that an array of nanowires having generally circular symmetry includes arrays in which asymmetries may be introduced due to two nanowires being close enough that their coatings abut one another.

Figure 7:
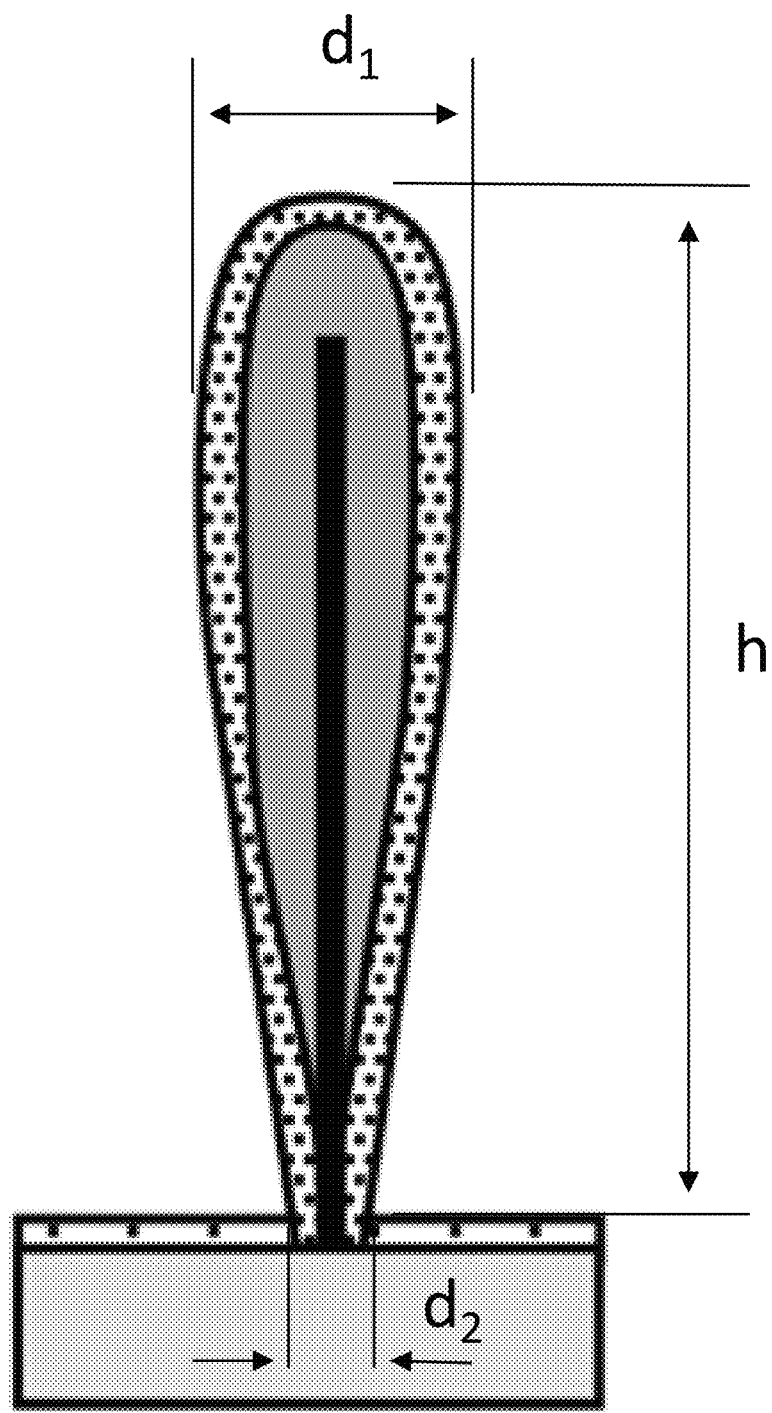
FIG. 7 shows a schematic depiction of a representation of a non-conformal silicon coating on a template nanowire.

FIG. 7 shows a schematic depiction of a representation of a coating as a water drop or a conical frustum. The dimensions d1, d2 and h are labeled, with d1 being the largest diameter of the coating, d2 being the bottom diameter of the coating, and h being the height of the anode after coating. The non-conformal coating (porous non-conformal coating alone, or porous non-conformal coating conformally coated with the dense coating) may be characterized in some embodiments by the following ratios: d1/h of ½ to ⅛, d2/h of 1/400 to 1/70 and a d1/d2 ratio of 50:1 to 1.5:1.

In an example, d1 may be between 4 and 15 microns, or 4 and 12 microns, d2 may be between about 0.2 and 2 microns, and height may be between about 20 and 50 microns, e.g., between about 30 and 40 microns. The coating may extend between 10 and 20 microns above the height of the nanowire in some embodiments. The non-conformal layer substantially coats the nanowire, with the non-conformal coating extending at least most of the length of the nanowires, and in some embodiments, coating the entire template. As described above, there may be discontinuities near or at the root of the nanowire template.

In one example, a nanowire having a diameter of about 10 to 50 nm and a length of between about 10 to 25 microns is coated with silicon, such that after coating the diameter of the nanostructure at the root is 100 to 400 nm, the maximum diameter is 2 to 20 microns, and the total height of the anode is 20 to 40 microns.

In some embodiments, a non-conformal layer may be characterized by a hydrogen (H) content of at least 10%. In some embodiments, a conformal, dense layer may be characterized by a bulk H content of no more than 7%, or no more than 5%.

The non-conformal, porous silicon layers may be deposited by a method such as evaporation or other physical vapor deposition (PVD) method or HWCVD instead of or in addition to PECVD.

In PECVD processes, according to various implementations, a plasma may be generated in a chamber in which the substrate is disposed or upstream of the chamber and fed into the chamber. Any type of plasma, including capacitively-coupled plasmas, inductively-coupled plasmas, and conductive coupled plasmas may be used. Any appropriate plasma source may be used, including DC, AC, RF and microwave sources may be used.

PECVD process conditions can vary according to the particular process and tool used. A fairly wide range of temperatures, e.g., 180° C. to 600° C., may be used. Pressures are generally low for plasma processes, e.g., ranging from 50 mTorr to 400 Torr, or 200 mTorr to 10 Torr, depending on the process.

In some implementations, the PECVD process is an expanding thermal plasma chemical vapor deposition (ETP-CVD) process. In such a process, a plasma generating gas is passed through a direct current arc plasma generator to form a plasma, with a web or other substrate including the nanowire template in an adjoining vacuum chamber. A silicon source gas is injected into the plasma, with radicals generated. The plasma is expanded via a diverging nozzle and injected into the vacuum chamber and toward the substrate, with a non-conformal layer of amorphous silicon formed on the nanowire template. An example of a plasma generating gas is argon (Ar). In some embodiments, the ionized argon species in the plasma collide with silicon source molecules to form radical species of the silicon source, resulting in deposition on the nanowire template. Example ranges for voltages and currents for the DC plasma source are 60 to 80 volts and 50 to 70 amperes, respectively.

The conformal, dense silicon layers may be deposited by a method as atomic layer deposition (ALD) instead of or in addition to thermal CVD. Any appropriate thermal CVD process may be used, such as low pressure CVD (LPCVD). Temperatures may go as high as the thermal budget allows in some embodiments, as long as no metal silicide is formed around nanowire-substrate interface due to the increase of temperature when using a metal substrate.

Any appropriate silicon source may be used for the non-conformal and conformal silicon layers, including silane ($SiH_4$), dichlorosilane ($H_2SiCl_2$), monochlorosilane ($H_3SiCl$), trichlorosilane ($HSiCl_3$), and silicon tetrachloride ($SiCl_4$) to form the silicon layers. Depending on the gas used, the amorphous silicon layer may be formed by decomposition or a reaction with another compound, such as by hydrogen reduction. According to various embodiments, the same or a different silicon source may be used for the each of the layers.

According to various embodiments, the PECVD processes result in non-conformal coatings due to gas phase radical generation of the silicon precursor and gas phase nucleation and condensation on the surfaces of the template. By contrast, the thermal CVD reactions are run at conditions that result in surface reactions. High energy and mobility at the surface results in a conformal layer. In some embodiments, chamber pressure during a thermal CVD process is kept low, e.g., 100 mTorr to 2 Torr to prevent gas phase reactions and non-conformal deposition. Higher pressures, e.g., higher than 2 Torr or 500 Torr can result in non-conformal deposition.

Additional description of depositing active material layers having controlled densities may be found in U.S. patent application Ser. No. 13/277,821, incorporated by reference herein.

As indicated above, the nanostructures may be characterized by a second silicon layer over a first silicon layer, the second silicon layer having a density higher than the density of the first silicon layer. In some embodiments, the first silicon layer may be deposited directly on the nanowire template, with the second silicon layer being the outermost shell of the coated template. However, in some embodiments, other layers may be present. For example, a thin dense silicon layer may be deposited on a nanowire template, followed by a thicker porous layer, and a second thin dense layer.

Still further, a non-Si layer may be the outermost shell of the nanostructure in some embodiments. Examples of layers include metal oxides such as aluminum oxide, titanium oxide, cobalt oxide, and zirconium oxide, metal nitrides, and silicon nitrides. In some embodiments, a thin layer of any of these may be deposited in addition to or instead of the dense Si layer described above.

According to various embodiments, each of the first and second silicon layers may have a uniform density. However, in some embodiments, deposition conditions may be tuned during deposition to provide a density gradient in one or both layers. For example, either layer may get denser toward the outer part of the layer. In such embodiments, an average density of the layer may be used to characterize the density of layer as described above.

In some embodiments, silicon may be deposited by HWCVD. In some such implementations, a single Si layer having a density between that typically deposited by PECVD and that typically deposited by TCVD may be deposited. It can also be used to coat both the first and the second Si coatings by tuning the deposition process.

EXPERIMENTAL

Figure 8A:
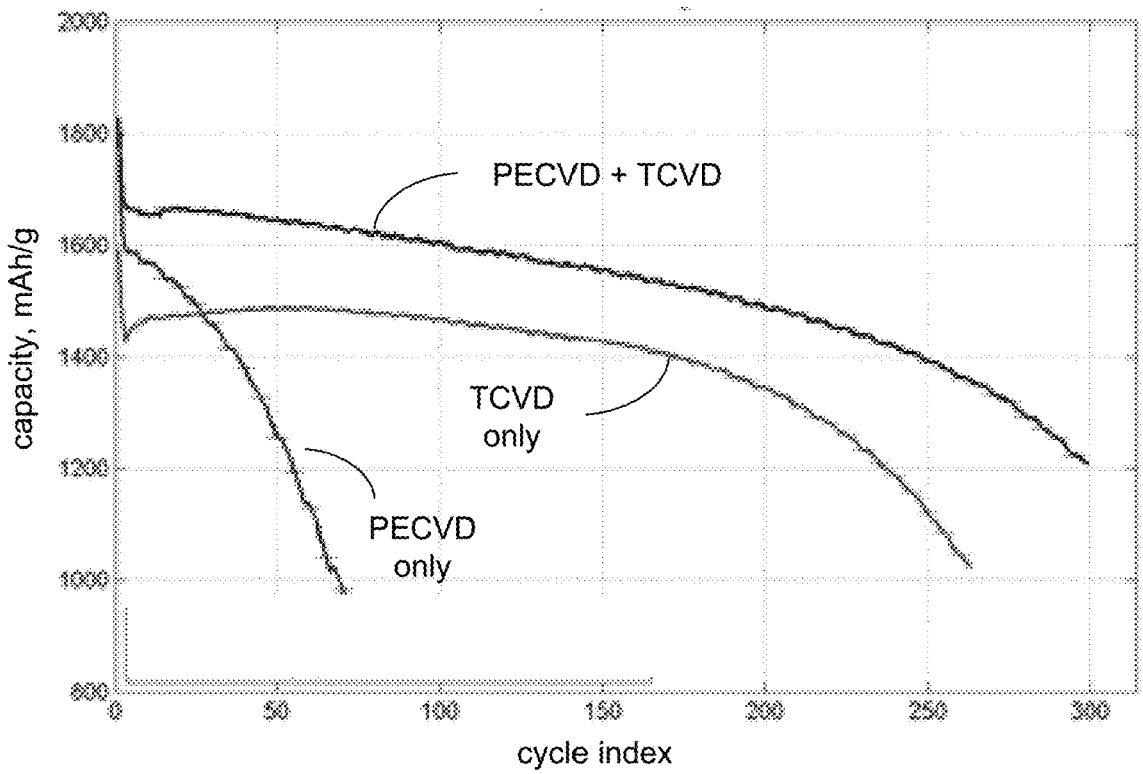
FIGS. 8A and 8B are graphs shown capacity vs. cycle number and capacity retention vs. cycle number for electrodes having templated PECVD+thermal CVD (TCVD) Si layers, templated PECVD-only Si layers, and templated TCVD-only layers.
Figure 8B:
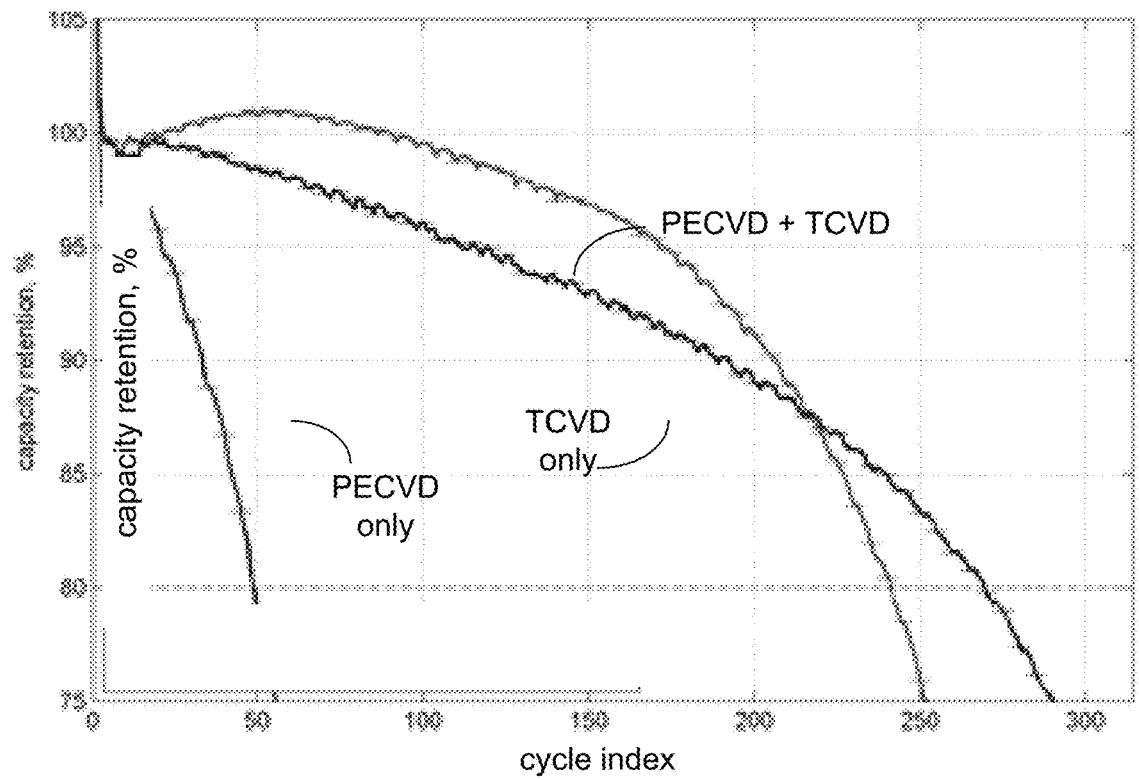

Cycling data from nanowires with two layers of Si as described herein, shows that such structures have increased cycle lifetimes over structures that are made using only PECVD or only thermal CVD. FIGS. 8A and 8B are graphs shown capacity vs. cycle number and capacity retention vs. cycle number for electrodes having templated PECVD+ thermal CVD (TCVD) Si layers, templated PECVD only Si layers, and template TCVD only layers. Capacity and capacity retention is highest for the PECVD+TCVD Si layers. As described above, the PECVD layer is a more porous, less dense internal layer and the TCVD layer is a denser external layer.

Assembly

Figure 9A:
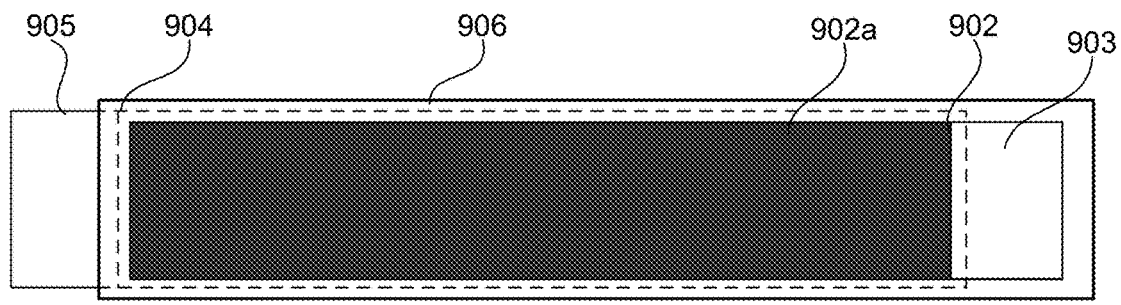
FIG. 9A is schematic representation of a plan view of a partially-assembled electrochemical cell that uses electrodes described herein, according to certain embodiments.

FIG. 9A is a plan view of a partially-assembled electrochemical cell that uses electrodes described herein, according to certain embodiments. The cell has a positive electrode active layer 902 that is shown covering a major portion of a positive current collector 903. The cell also has a negative electrode active layer 904 that is shown covering a major portion of a negative current collector 905. Separator 906 is between the positive electrode active layer 902 and the negative electrode active layer 904.

In one embodiment, the negative electrode active layer 904 is slightly larger than the positive electrode active layer 902 to ensure trapping of the lithium ions released from the positive electrode active layer 902 by the active material of the negative electrode active layer 904. In one embodiment, the negative electrode active layer 904 extends at least between about 0.25 millimeters and 7 millimeters beyond the positive electrode active layer 902 in one or more directions. In a more specific embodiment, the negative electrode active layer 904 extends beyond the positive electrode active layer 902 by between about 1 millimeter and 2 millimeters in one or more directions. In certain embodiments, the edges of the separator 906 extend beyond the outer edges of at least the negative electrode active layer 904 to provide the complete electronic insulation of the negative electrode from the other battery components.

Figure 9B:
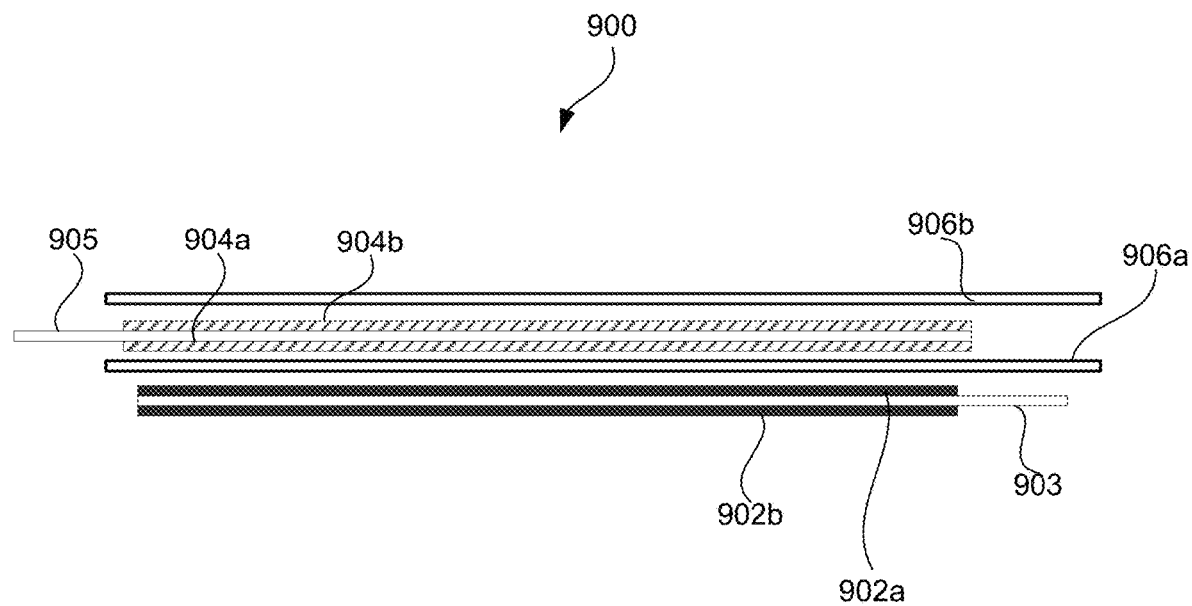
FIG. 9B is schematic representation of a cross-sectional view of an electrode stack of a partially-assembled electrochemical cell that uses electrodes described herein, according to certain embodiments.

FIG. 9B is a cross-sectional view of an electrode stack 900 of the partially-assembled electrochemical cell that uses electrodes described herein, according to certain embodiments. There is a positive current collector 903 that has a positive electrode active layer 902a on one side and a positive electrode active layer 902b on the opposite side. There is a negative current collector 905 that has a negative electrode active layer 904a on one side and a negative electrode active layer 904b on the opposite side. There is a separator 906a between the positive electrode active layer 902a and the negative electrode active layer 904a. The separator sheets 906a and 906b serves to maintain mechanical separation between the positive electrode active layer 902a and the negative electrode active layer 904a and acts as a sponge to soak up the liquid electrolyte (not shown) that will be added later. The ends of the current collectors 903, 905, on which there is no active material, can be used for connecting to the appropriate terminal of a cell (not shown).

Together, the electrode layers 902a, 904a, the current collectors 903, 905, and the separator 906a can be said to form one electrochemical cell unit. The complete stack 900 shown in FIG. 9B, includes the electrode layers 902b, 904b and the additional separator 906b. The current collectors 903, 905 can be shared between adjacent cells. When such stacks are repeated, the result is a cell or battery with larger capacity than that of a single cell unit.

Figure 10A:
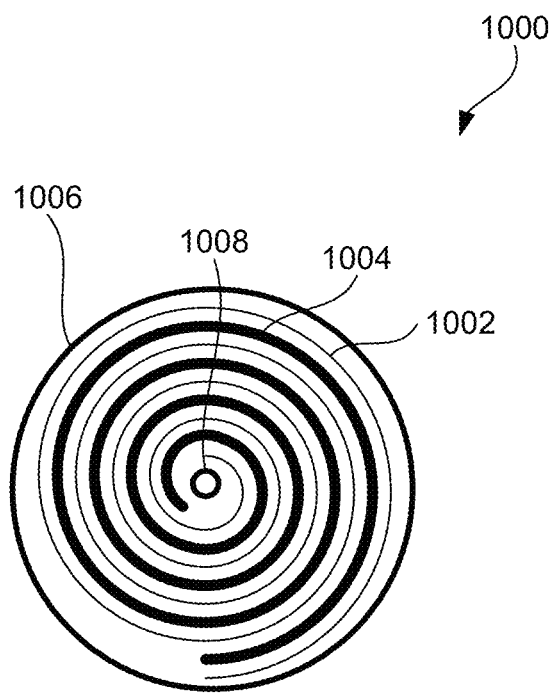
FIGS. 10A-10C are schematic representations of various views of electrodes wound together with two sheets of separator to form a cell according to certain embodiments.
Figure 10B:
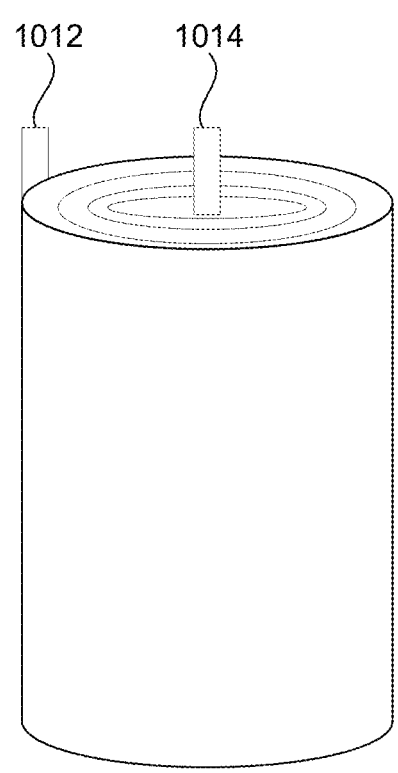

Another way to make a battery or cell with large capacity is to make one very large cell unit and wind it in upon itself to make multiple stacks. The cross-section schematic illustration in FIG. 10A shows how long and narrow electrodes can be wound together with two sheets of separator to form a battery or cell, sometimes referred to as a jellyroll 1,000. The jellyroll is shaped and sized to fit the internal dimensions of a curved, often cylindrical, case 1002. The jellyroll 1,000 has a positive electrode 1006 and a negative electrode 1004. The white spaces between the electrodes are the separator sheets. The jelly roll can be inserted into the case 1002. In some embodiments, the jellyroll 1,000 may have a mandrel 1008 in the center that establishes an initial winding diameter and prevents the inner winds from occupying the center axial region. The mandrel 1008 may be made of conductive material, and, in some embodiments, it may be a part of a cell terminal. FIG. 10B shows a perspective view of the jelly roll 1,000 with a positive tab 1012 and a negative tab 1014 extending from the positive current collector (not shown) and the negative current collector (not shown), respectively. The tabs may be welded to the current collectors.

The length and width of the electrodes depend on the overall dimensions of the cell and thicknesses of the active layers and the current collectors. For example, a conventional 18650-type cell with 18 mm diameter and 85 mm length may have electrodes that are between about 300 and 1,000 mm long. Shorter electrodes corresponding to lower rate/higher capacity applications are thicker and have fewer winds.

A cylindrical design may be used for some lithium ion cells especially when the electrodes can swell during cycling and thus exert pressure on the casing. It is useful to use a cylindrical casing that is as thin as possible while still being able to maintain sufficient pressure on the cell (with a good safety margin). Prismatic (flat) cells may be similarly wound, but their case may be flexible so that they can bend along the longer sides to accommodate the internal pressure. Moreover, the pressure may not be the same within different parts of the cell, and the corners of the prismatic cell may be left empty. Empty pockets may be avoided within lithium ions cells because electrodes tend to be unevenly pushed into these pockets during electrode swelling. Moreover, the electrolyte may aggregate in empty pockets and leave dry areas between the electrodes, negatively affecting lithium ion transport between the electrodes. Nevertheless, for certain applications, such as those dictated by rectangular form factors, prismatic cells are appropriate. In some embodiments, prismatic cells employ stacks of rectangular electrodes and separator sheets to avoid some of the difficulties encountered with wound prismatic cells.

Figure 10C:
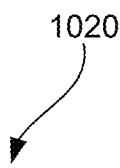

FIG. 10C illustrates a top view of a wound prismatic jellyroll 1020. The jellyroll 1020 includes a positive electrode 1024 and a negative electrode 1026. The white space between the electrodes is the separator sheet. The jelly roll 1020 is enclosed in a rectangular prismatic case 1022. Unlike the cylindrical jellyroll shown in FIG. 12, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 11A:
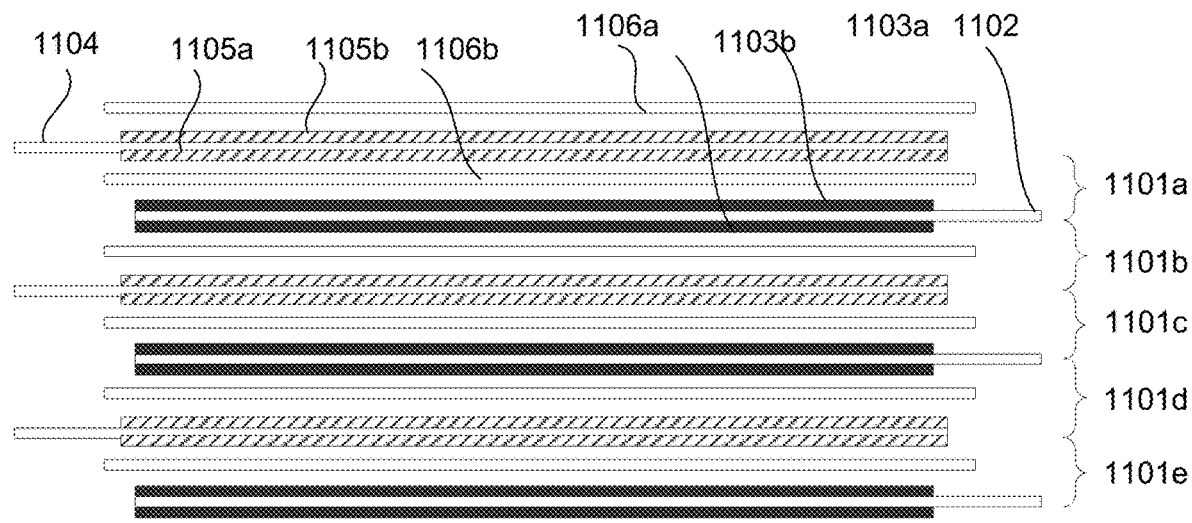
FIGS. 11A and 11B are schematic representations of cross-sectional and perspective views of a stacked cell that includes a plurality of cells according to certain embodiments.
Figure 11B:
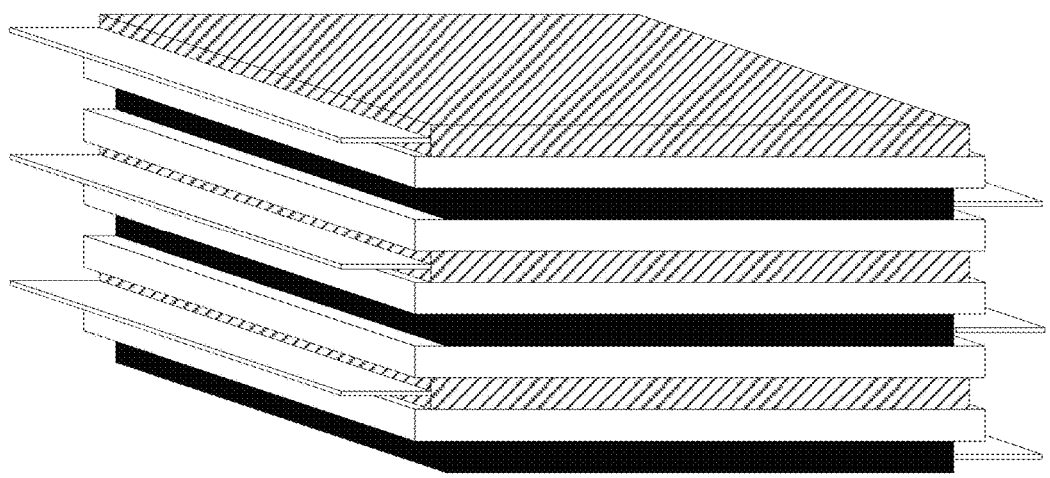

FIG. 11A illustrates a cross-section of a stacked cell that includes a plurality of cells (1101a, 1101b, 1101c, 1101d, and 1101e), each having a positive electrode (e.g., 1103a, 1103b), a positive current collector (e.g., 1102), a negative electrode (e.g., 1105a, 1105b), a negative current collector (e.g., 1104), and a separator (e.g., 1106a, 1106b) between the electrodes. Each current collector is shared by adjacent cells. A stacked cell can be made in almost any shape, which is particularly suitable for prismatic batteries. The current collector tabs typically extend from the stack and lead to a battery terminal. FIG. 11B shows a perspective view of a stacked cell that includes a plurality of cells.

Once the electrodes are arranged as described above, the cell is filled with electrolyte. The electrolyte in lithium ions cells may be liquid, solid, or gel. The lithium ion cells with the solid electrolyte are referred to as a lithium polymer cells.

A typical liquid electrolyte comprises one or more solvents and one or more salts, at least one of which includes lithium. During the first charge cycle (sometimes referred to as a formation cycle), the organic solvent in the electrolyte can partially decompose on the negative electrode surface to form a SEI layer. The interphase is generally electrically insulating but ionically conductive, thereby allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4 LiAsF_6$, $LiN(CF_3SO_2)_2$, $LiN(C2F5SO2)2$, $LiCF3SO3$, $LiC(CF3SO2)3$, $LiPF4(CF3)2$, $LiPF3(C2F5)3$, $LiPF3(CF3)3$, $LiPF3(iso-C3F7)3$, $LiPF5(iso-C3F7)$, lithium salts having cyclic alkyl groups (e.g., $(CF2)2(SO2)2xLi$ and $(CF2)3(SO2)2xLi$), and combinations thereof. Common combinations include LiPF6 and LiBF4, LiPF6 and LiN(CF3 SO2)2, LiBF4 and LiN(CF3SO2)2.

In one embodiment, the total concentration of salt in a liquid nonaqueous solvent (or combination of solvents) is at least about 0.3 M; in a more specific embodiment, the salt concentration is at least about 0.7 M. The upper concentration limit may be driven by a solubility limit or may be no greater than about 2.5 M; in a more specific embodiment, it may be no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro-ethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PNMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

Figure 12:
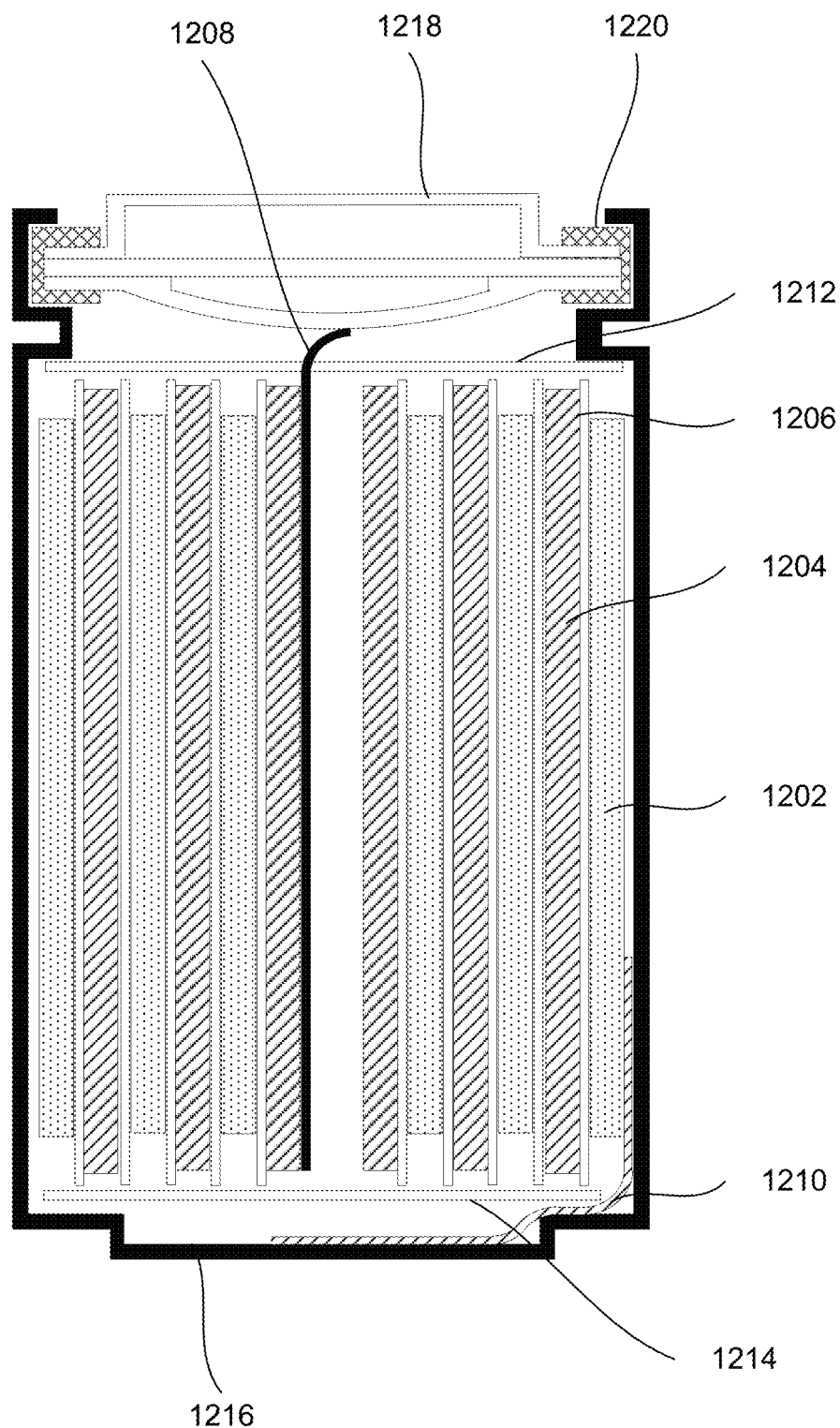
FIG. 12 is schematic representation of cross-sectional view of a wound cylindrical cell, in accordance with certain embodiments.

FIG. 12 illustrates a cross-section view of a wound cylindrical cell, in accordance with one embodiment. A jelly roll comprises a spirally wound positive electrode 1202, a negative electrode 1204, and two sheets of the separator 1206. The jelly roll is inserted into a cell case 1216, and a cap 1218 and gasket 1220 are used to seal the cell. It should be noted that in certain embodiments a cell is not sealed until after subsequent operations. In some cases, cap 1218 or cell case 1216 includes a safety device. For example, a safety vent or burst valve may be employed to open if excessive pressure builds up in the battery. In certain embodiments, a one-way gas release valve is included to release oxygen that has been released during activation of the positive material. Also, a positive thermal coefficient (PTC) device may be incorporated into the conductive pathway of cap 1218 to reduce the damage that might result if the cell suffered a short circuit. The external surface of the cap 1218 may be used as the positive terminal, while the external surface of the cell case 1216 may serve as the negative terminal. In an alternative embodiment, the polarity of the battery is reversed and the external surface of the cap 1218 is used as the negative terminal, while the external surface of the cell case 1216 serves as the positive terminal. Tabs 1208 and 1210 may be used to establish a connection between the positive and negative electrodes and the corresponding terminals. Appropriate insulating gaskets 1214 and 1212 may be inserted to prevent the possibility of internal shorting. For example, a Kapton™ film may be used for internal insulation. During fabrication, the cap 1218 may be crimped to the cell case 1216 in order to seal the cell. However, prior to this operation, electrolyte (not shown) is added to fill the porous spaces of the jelly roll.

A rigid case is typically used for lithium ion cells, while lithium polymer cells may be packed into flexible, foil-type (polymer laminate) cases. A variety of materials can be chosen for the cases. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

In addition to the battery applications described above, the nanostructures may be used in fuel cells (e.g., for anodes, cathodes, and electrolytes), hetero-junction solar cell active materials, various forms of current collectors, and/or absorption coatings.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself

We claim:

1. A method of making an anode for a lithium battery, comprising the steps of:
   providing a substrate having nanowires attached thereto such that the nanowires have free ends and substrate-rooted ends;
   depositing a first silicon layer over the nanowires using a PECVD method;
   depositing a second silicon layer over the first silicon layer, the nanowires, and
   the substrate using a thermal CVD method, wherein the first silicon layer has a thickness of between 0.5 and 50 microns at the free ends of the nanowires.

2. The method of claim 1, wherein the first silicon layer has a thickness that varies in a direction vertical to the substrate.

3. The method of claim 1, wherein the first silicon layer is non-conformal to the nanowires.

4. The method of claim 3, wherein the second silicon layer is conformal to the surface it deposited on, including the first silicon layer, the substrate, and any exposed portion of the nanowires.

5. The method of claim 1, wherein chamber pressure during the thermal CVD method is less than about 2 Torr.

6. The method of claim 1, wherein the PECVD method is an expanding thermal plasma (ETP) method.

7. The method of claim 1, wherein the first silicon layer is thicker at the free ends of the nanowires than at the substrate-rooted ends.

8. The method of claim 1, wherein the second silicon layer has a thickness of between 10 and 500 nm thick.

9. The method of claim 1, wherein the second silicon layer has a uniform thickness.

10. The method of claim 1, wherein the first silicon layer has a thickness of between 0.5 and 10 microns at the free ends of the nanowires.

11. The method of claim 1, wherein the first silicon layer has a thickness between 10 and 50 microns at the free ends of the nanowires.

12. The method of claim 1, wherein the second silicon layer is amorphous.

13. A method of making an anode for a lithium battery, comprising the steps of:

providing a substrate having nanowires attached thereto;

depositing a first silicon layer over the nanowires using a PECVD method;

depositing a second silicon layer over the first silicon layer, the nanowires, and the substrate using a thermal CVD method, wherein the second silicon layer is amorphous.

14. The method of claim 13, wherein the PECVD method is an expanding thermal plasma (ETP) method.

15. The method of claim 13, wherein the nanowires are silicide nanowires.

16. The method of claim 13, wherein chamber pressure during the thermal CVD method is less than about 2 Torr.

17. The method of claim 13, wherein the first silicon layer has a thickness that varies in a direction vertical to the substrate.

18. The method of claim 13, wherein the first silicon layer is non-conformal to the nanowires.

19. The method of claim 18, wherein the second silicon layer is conformal to the surface it deposited on, including the first silicon layer, the substrate, and any exposed portion of the nanowires.

20. The method of claim 13, wherein the second silicon layer has a thickness of between 10 and 500 nm thick.

21. The method of claim 13, wherein providing the substrate having nanowires attached thereto comprises growing the nanowires from the substrate.

22. The method of claim 13, wherein the nanowires have free ends and substrate-rooted ends.

* * * * *